(12) United States Patent
Zare Seisan

(10) Patent No.: US 12,204,108 B2
(45) Date of Patent: Jan. 21, 2025

(54) OPACITY CONTROL OF AUGMENTED REALITY DEVICES

(71) Applicant: Snap Inc., Santa Monica, CA (US)

(72) Inventor: Farid Zare Seisan, San Diego, CA (US)

(73) Assignee: Snap Inc., Santa Monica, CA (US)

( * ) Notice: Subject to any disclaimer, the term of this patent is extended or adjusted under 35 U.S.C. 154(b) by 82 days.

(21) Appl. No.: 17/950,923

(22) Filed: Sep. 22, 2022

(65) Prior Publication Data

US 2024/0103271 A1 Mar. 28, 2024

(51) Int. Cl.
| | |
|---|---|
| *G02B 27/01* | (2006.01) |
| *G06T 19/00* | (2011.01) |
| *G06T 19/20* | (2011.01) |
| *G06V 10/60* | (2022.01) |
| *G06V 10/70* | (2022.01) |

(52) U.S. Cl.
CPC ........ *G02B 27/0172* (2013.01); *G06T 19/006* (2013.01); *G06T 19/20* (2013.01); *G06V 10/60* (2022.01); *G06V 10/70* (2022.01); *G02B 2027/0178* (2013.01)

(58) Field of Classification Search
CPC .................. G06T 19/006; G06T 19/20; G02B 27/0172; G06V 10/60
USPC .......................................................... 345/633
See application file for complete search history.

(56) References Cited

U.S. PATENT DOCUMENTS

| | | | |
|---|---|---|---|
| 4,595,262 A | 6/1986 | Ogle | |
| 5,886,822 A | 3/1999 | Spitzer | |
| 8,780,014 B2 * | 7/2014 | Border | G02B 27/01 |
| | | | 348/E5.145 |
| 11,256,092 B2 * | 2/2022 | Shamir | G06F 3/048 |
| 2018/0088323 A1 * | 3/2018 | Bao | G02B 27/017 |
| 2018/0188536 A1 | 7/2018 | Bell et al. | |
| 2018/0190011 A1 | 7/2018 | Platt et al. | |
| 2020/0111259 A1 | 4/2020 | Sears et al. | |
| 2021/0011290 A1 | 1/2021 | Maimone et al. | |
| 2023/0194873 A1 | 6/2023 | Jamali et al. | |

FOREIGN PATENT DOCUMENTS

| | | |
|---|---|---|
| EP | 0182698 | 1/1989 |
| WO | WO-2024064812 A1 | 3/2024 |

OTHER PUBLICATIONS

"International Application Serial No. PCT US2023 074771, International Search Report mailed Jan. 16, 2024", 4 pgs.
"International Application Serial No. PCT US2023 074771, Written Opinion mailed Jan. 16, 2024", 6 pgs.

* cited by examiner

*Primary Examiner* — Thomas J Lett
(74) *Attorney, Agent, or Firm* — Schwegman Lundberg & Woessner, P.A.

(57) ABSTRACT

An augmented reality (AR) eyewear device has a lens system which includes an optical screening mechanism that enables switching the lens system between a conventional see-through state and an opaque state in which the lens system screens or functionally blocks out the wearer's view of the external environment. Such a screening mechanism allows for expanded use cases of the AR glasses compared to conventional devices, e.g.: as a sleep mask; to view displayed content like movies or sports events against a visually non-distracting background instead of against the external environment; and/or to enable VR functionality.

19 Claims, 10 Drawing Sheets

OPACITY CONTROL OF AUGMENTED REALITY DEVICES

BACKGROUND

Head-worn augmented reality (AR) devices (e.g., AR-enabled eyewear) are often implemented with a near-eye display hosted by a transparent or semitransparent lens assembly through which the surrounding environment (the "real world") is visible to a wearer. Such near-eye displays are typically themselves partially transparent, so that objects rendered by the near-eye display (e.g., virtual objects such as 3D renderings, images, video, text, and so forth) appear to the wearer as overlaid on their real-world surrounds. AR displays in such devices are often stereoscopic, producing an illusion of depth and/or 3D location in the environment by displaying two slightly different images to the right and left eye of the wearer.

This is typically referred to as "augmented reality," which is to be distinguished from the experience provided by a head-worn device which completely occludes the wearer's visual field and displays a virtual environment through which a wearer may appear to move or be moved, typically referred to as "virtual reality" or VR. As used herein, the term "augmented reality" or "AR" refers to both augmented reality and virtual reality as traditionally understood, unless the context indicates otherwise.

In some examples, AR devices take the form of AR glasses, being electronics-enabled eyewear devices (commonly referred to as smart glasses) configured for regular wear in the manner of corrective spectacles or sunglasses. As is the case with conventional non-smart eyewear, a pair of AR glasses typically has a lens system provided by left and right lens assemblies through which the ambient environment is viewed during wear, with near-eye AR displays often being natively integrated in the glasses to render visual imagery in respective display areas in or the lens system. Some examples of such near-eye displays include a waveguide incorporated in the lens assembly to receive light beams from a projector, but a variety of different suitable display mechanisms have been used in other instances.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some nonlimiting examples are illustrated in the figures of the accompanying drawings in which.

DETAILED DESCRIPTION

Figure 1:
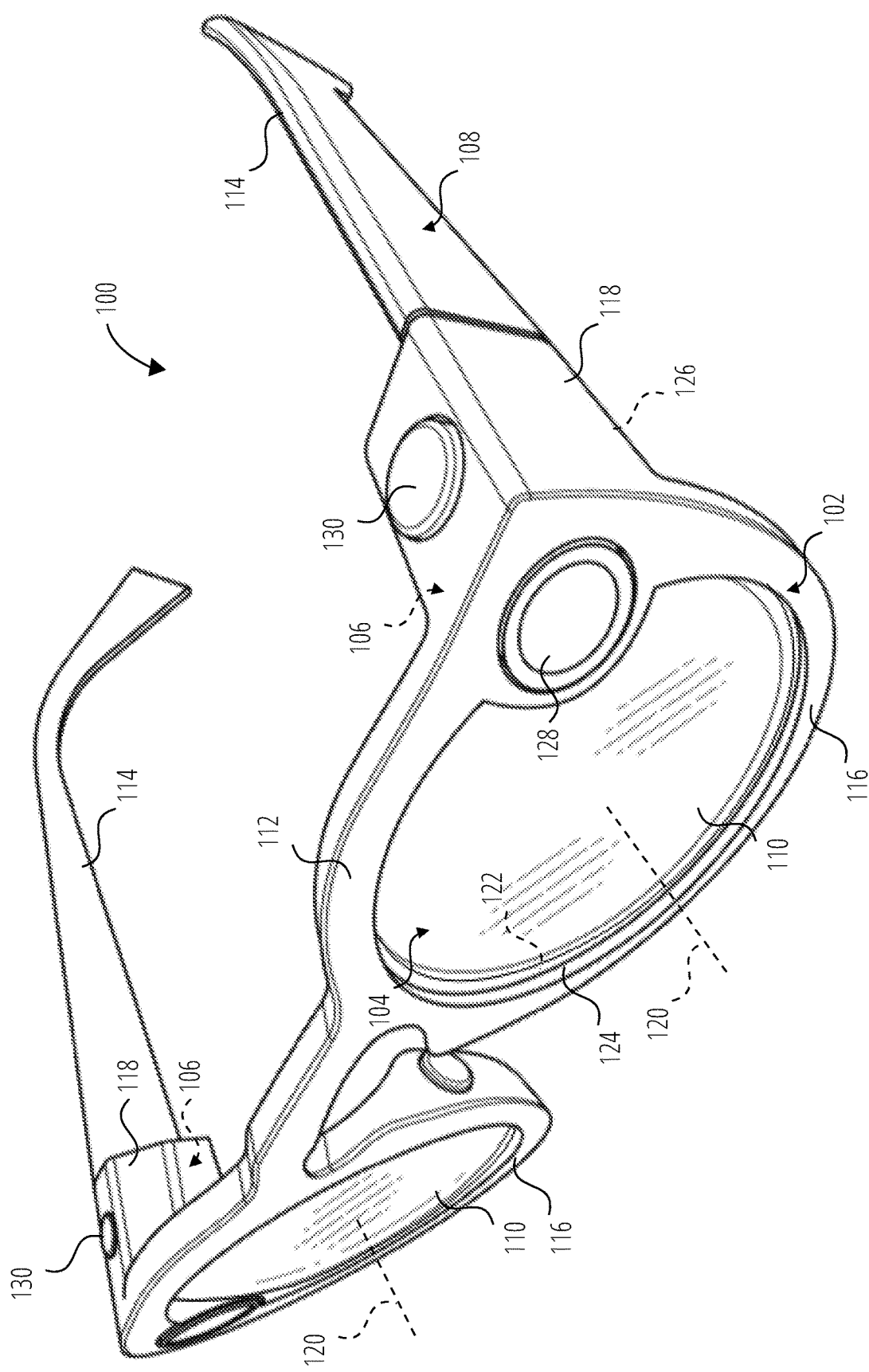
FIG. 1 is a schematic three-dimensional view of an AR-enabled eyewear device in the form of AR glasses, being smart glasses with native AR capabilities, according to one example.

One example of the disclosure provides AR glasses whose lens system includes an optical screening mechanism that enables switching the lens system between a conventional see-through state and an opaque state in which the lens system screens or functionally blocks out the wearer's view of the external environment. Such a screening mechanism allows for expanded use cases of the AR glasses compared to conventional devices, e.g.: as a sleep mask; to view displayed content like movies or sports events against a visually non-distracting background instead of against the external environment; and/or to enable VR functionality.

In the see-through state, the lens system is functionally transparent, by which is meant that it is sufficiently transparent to allow use of the AR glasses in the manner of corrective spectacles or sunglasses. In the opaque state, the lens system is not functionally transparent, also referred to herein as being functionally opaque. Note that description herein of an object as being "functionally opaque" or "functionally non-transparent" includes not only that the object can be opaque (i.e., being non-transmissive to visible light, thus being neither transparent nor translucent, which state is for ease of understanding on occasion herein referred to a being fully opaque) but also includes that the object can be translucent (i.e., transmitting some light but insufficiently so as to be functionally transparent, or causing sufficient diffusion to prevent perception of distinct images).

In some examples, the screening mechanism enables the AR glasses to be switched to a block-out state in which the lens system is fully opaque, thus wholly blocking out view of the environment. It will be understood that, as used herein, that block-out state and the opaque state are not mutually exclusive but that the block-out state is instead a particular, more limited instance of the opaque state. Worded differently, in all instances where a lens system is in the block-out state it is also in the opaque state, but lens systems can in some instances be in the opaque state without being in the block-out state (e.g., being translucent or having an opacity level of 98%, allowing the passage of 2% of visible light).

One example in which the wearer may profitably choose to use the AR glasses in the opaque state is for watching non-AR visual media such as movies or sporting events. Thus, the near eye display and opaque state in combination effectively enables use of the AR glasses in a VR mode or cinema mode in which the wearer can, e.g., sit down to watch a movie undistracted. It will be appreciated that, in the see-through state, a near-eye display provided in or on the lens system is set against or overlaid on the wearer's view of their environment provided by light that passes through the lens assembly, in effect backlighting the near eye display. In the opaque state, however, screening out of such backlighting improves perceived quality and brightness of display, having a backdrop much greater in contrast. Additionally, blinding the user to their surroundings in the opaque state greatly minimizes visual distractions from the content presented to the wearer.

In other instances, when disposed to the opaque state while the near eye display is inactive, the glasses in effect provide sleep mask-functionality, blocking ambient light to facilitate falling asleep or undistracted rest. Note that some examples of the disclosure provide for an integrated lens screening mechanism incorporated in an eyewear device without integrated display functionality. In one example, the screening mechanism for such a non-AR and/or non-smart eyewear device comprises dynamically adjustable dual-polarizer screening technology as described further below with reference display-enabled devices.

In some examples, the screening mechanism enables graduated or smooth variation in the opacity of the lens system between, on the one hand, a maximally transparent setting at an upper limit of lens clarity (i.e., being at the upper limit of transparency or optical transmissivity and being inversely being at the lower limit of opacity) and, at the other hand, a maximally opaque setting at a darkest limit of the opaque state. Such graduated or continuous adjustability of the lens opacity permits automated or user-controlled darkening or lightening of the lens assembly, effectively changing the tint of the glasses to personal taste or responsive to ambient light conditions for providing sunglass functionality.

In some examples which permit switching of the screening mechanism to the block-out state, the screening mechanism comprises two stacked polarizers that are movable relative to one another so as to allow the respective axes of polarization to be brought perpendicular to each other. As is well established, two stacked polarizers whose polarization axes are normal to one another are effectively fully opaque, blocking practically all light from passing therethrough.

A "polarizer" is an optical element that lets light waves of a specific polarization pass through while blocking light waves of other polarizations. It can filter a beam of light of undefined or mixed polarization into a beam of well-defined polarization, that is polarized light. The polarization axis of a polarizer is defined by the direction along which the polarizer passes the electric field of a light wave, so that the polarization axis is parallel to the plane in which light waves filtered thereby oscillate. The polarizers are in some examples a pair of linear polarizers and in other examples a pair of circular polarizers.

"Stacked" refers (in the context of optical eyewear elements such as lenses, polarizers, or filters) to relative spatial arrangement of the relevant elements such that they are more or less parallel to each other and are in alignment one behind the other along a user's line of sight, to which they are oriented transversely. Stacked optical elements are thus spaced along the user's line of sight, being located one behind the other so that the user's view of ambient environments is provided by light traveling through all of the stacked elements sequentially. Stacked elements need not be immediately adjacent to one another. Thus, for example, a lens assembly that includes two polarizers sandwiching a clear lens between them together comprise a pair of stacked polarizers.

In some examples, the pair of polarizers are provided by a fixed polarized lens and a movable polarized lens or filter housed in an actuated mount that permits it to be rotated through 90° relative to the fixed lens. In one example, the actuated mount is provided by a circular rim ring or frame extending circumferentially about the radially outer periphery of a circular polarized filter. Control of the screen mechanism is in some embodiments exclusively selective, responsive to user input. A variety of user control mechanisms can be employed separately or in combination in different embodiments.

Thus, for example, the user can selectively control the screening mechanism to block or unblock ambient light by providing opacity control input, e.g., by pressing control buttons on the glasses, by using a companion mobile phone application, by using voice control, and/or by use of other manual interactions such as a haptic input on a touchscreen side panel on a temple of the glasses, and/or a sequence of tap-inputs. Other suitable input mechanisms can alternatively or cumulatively be employed in various other examples.

Instead, or in addition, some examples provide for autonomous switching between the see-through state in the opaque state (also referred to in some instances herein as an AR mode and a VR mode respectively) based on use cases and/or sensor data indicating user behavior and/or biometric data. For example, an opacity controller incorporated in the glasses is in some examples configured to monitor, while in the see-through state, whether or not a wearer of the device has fallen asleep and, if so, to automatically switch the lens system to the opaque state by actuated rotation of the adjustable polarized filter. In some examples, automatic switching of the optical state of the lens system is implemented using a trained machine learning model to identify when to perform autonomous switching from the opaque state to the see-through state, and/or vice versa.

Thus, one aspect of the disclosure provides a device that comprises:
 a lens system comprising a lens assembly;
 an eyewear body on which the lens assembly is mounted, the eyewear body being configured for head-mounted wear during which the lens assembly is supported in position to occupy a wearer's field-of-view, such that wearer-perspective view of an ambient environment is through the lens assembly;

a display mechanism configured to provide to the wearer a near-eye display visually coincident with the lens assembly; and a screening mechanism incorporated in the lens assembly and configured to selectively dispose the lens assembly between at least two different optical states, which optical states include:

(a) a see-through state in which the lens assembly is functionally transparent, so that the near-eye display is overlaid on a view of the ambient environment provided by exterior light passing through the lens assembly; and an opaque state in which the lens assembly is functionally opaque to ambient light, blocking ambient backlighting of the near-eye display.

The lens system is in some embodies provided by a pair of lens assemblies, each held in use before a respective eye of the wearer, with the screening mechanism comprising a respective optical screening arrangement provided by separate components of each of the lens assemblies. The screening mechanism is in some examples configured such that the opaque state of the lens assembly constitutes a block-out state in which the lens assembly is fully opaque, blocking substantially any ambient light from passing through it. One such example is by a pair of stacked polarizers whose polarization axes can be positioned orthogonal to one another.

In some examples, the screening mechanism is configured to enable graduated variation in opacity of the lens assembly, thereby enabling controlled graduated variation in ambient backlighting intensity to the near-eye display. One such example is provided by one of the pair of stacked polarizers comprising a polarized filter smoothly rotatable relative to the other polarizer.

The device in some examples includes one or more opacity control input channels that permit selective user-controlled graduated variation in opacity of the lens assembly. Examples of such input channels include a manual input receiver (e.g., a button or touch pad) carried by the eyewear body and, instead or in addition, a mechanical lever or control tab manipulable to control lens opacity.

The screening mechanism is in some examples configured such that objective intensity of the near-eye display is unaffected by variation in opacity of the lens assembly. This is in some examples achieved by locating the near-eye display in front of the nearer one of the pair of polarizers, as seen from the perspective of the wearer. Ambient light is in use polarized by the further one of the polarizers, which is then mostly or wholly blocked by the nearer polarizer when in the opaque mode. An effect of such arrangements is that reduction in opacity of the screening mechanism increases brightness contrast between display foreground and background, increasing subjectively perceived brightness or intensity of the display.

Thus, the screening mechanism in some examples comprises a pair of stacked polarizers incorporated in the lens assembly, the pair of polarizers being selectively movable relative to one to modify composite opacity of the pair of polarizers by changing relative orientation of respective polarization axes of the stacked polarizers, thereby to effect switching of the lens assembly between the see-through state and the opaque state, the opaque state in some embodiments including a block-out state.

In some embodiments, the pair of stacked polarizers is provided by a static polarizer fixed in position relative to the eyewear body, and a movable polarizer that is configured to be selectively movable relative to the eyewear body about a rotational axis substantially aligned with a operative viewing direction through the lens assembly. The static polarizer is in some examples integrated with a primary optical element of the lens assembly, for example comprising a polarized fil attached to the outwardly directed major face of glass or polymer lens element that hosts the near-eye display, the movable polarizer being located to a frontal side of the primary optical element, further from a wearer of the device, the near-eye display thus in wearer field-of-view being located in front of the movable polarizer.

In some examples, the movable polarizer is manually adjustable in rotational orientation relative to the rotational axis. In other examples, the screening mechanism further comprises an actuator (for example an electro-mechanical motor) configured to effect driven modification of a rotational orientation of the movable polarizer relative to the static polarizer. In some such examples, the screening mechanism further comprises a selective control mechanism providing an opacity control input channel configured to receive user-provided mode switching commands and, responsive thereto, to switch the lens assembly between the opaque state and the see-through state by driven movement of the movable polarizer via operation of the actuator.

In some examples, the device is configured for autonomous opacity control of the one or more lens assembly via the screening mechanism. The device in such examples further includes an opacity controller provided by one or more computer processor devices housed by the eyewear body, the one or more computer processor devices being configured for dynamic autonomous mode switching by performing operations comprising: continually receiving current sensor data captured by one or more sensors incorporated in the eyewear body; and based at least in part on the current sensor data, autonomously switching the lens assembly from one of the see-through state and the opaque state to the other. In some such examples, opacity controller is configured to provide automated control of the screening mechanism by performing operations which includes, while the lens assembly is in a first one of its optical states, identifying satisfaction of predefined mode switching criteria applicable to said first optical state, and responsive to satisfaction of the applicable mode switching criteria, automatically effecting disposal of the lens assembly from said first optical mode to a second, different one of the optical states of the lens assembly.

In one example, the switching criteria for automatically switching the lens assembly from the see-through state to the opaque state includes, in combination: (a) that a wearer of the device is in a non-ambulatory state, and (b) reception of selection input for reproduction by the near-eye display of non-AR visual content. Thus, when the wearer sits down and starts watching a movie, the glasses automatically switch to the black-out mode or state.

Instead, or in addition, the mode switching criteria applicable to switching the lens assembly from the see-through state to the opaque state includes identification that the wearer has entered a sleep state. Thus, when the user falls asleep, the eyewear device automatically switches to a sleep mode in which ambient light is blocked out, sleep mask-fashion.

Another aspect of the disclosure provide for a method of operating an eyewear device, the method comprising:

accessing operational data from an electronics-enabled eyewear device having an optical system that is switchable between different optical states which includes, at least, (a) a see-through state and (b) an opaque state in which a wearer's view of their environment is obscured by the lens assembly, the operational data including a current optical state of the optical system and sensor data captured by one or more sensors integrated in the eyewear device;

while the lens assembly is in a first one of its optical states, identifying satisfaction of predefined mode switching criteria applicable to said first optical state; and responsive to satisfaction of said mode switching criteria, automatically effecting disposal of the lens assembly from said first optical state mode to a second, different one of the optical states of the lens assembly.

The method may also include where the predefined mode switching criteria applicable while the lens assembly is in the see-through state includes identification that the wearer has fallen asleep.

In some examples, autonomous mode switching functionality is provided from only one of the optical states (e.g., switching autonomously only from opaque to see-through), but in other examples bi-directional autonomous mode switching is provided. In some examples, the predefined mode switching criteria applicable while the lens assembly is in the see-through state includes identification that the wearer is in a non-ambulatory state, e.g., sitting or lying down.

Yet a further aspect of the disclosure provides for a non-transitory computer-readable storage medium including instructions that, when processed by a computer, configure the computer to perform operations comprising:

accessing operational data from an electronics-enabled eyewear device having an optical system that is switchable between different optical states which includes, at least, (a) a see-through state and (b) an opaque state in which a wearer's view of their environment is obscured by the lens assembly, the operational data including a current optical state of the optical system and sensor data captured by one or more sensors integrated in the eyewear device;

while the lens assembly is in a first one of its optical states, identifying satisfaction of predefined mode switching criteria applicable to said first optical state; and responsive to satisfaction of said mode switching criteria, automatically effecting disposal of the lens assembly from said first optical state mode to a second, different one of the optical states of the lens assembly.

Other technical features may be readily apparent to one skilled in the art from the following figures, descriptions, and claims.

Turning now to a more detailed description of a particular example embodiment, FIG. 1 shows an oblique front view of an electronics-enabled eyewear device in example form of a pair of AR glasses 100 having an integrated near-eye display mechanism 106 and an optical screening mechanism 102 integrated in a lens system 104 of the AR glasses 100. The screening mechanism 102 enables the lens system 104 to be operated in at least two different operational modes in which the lens system 104 are in different respective optical states with respect to transmissivity of ambient light. The different optical states of the screening mechanism 102 in this example include: (a) a see-through state the lens system 104 is functionally transparent to enable AR glasses 100 to operate in an AR mode in which augmented reality functionalities are available; and (b) an opaque state in which it is functionally non-transparent, in this example comprising a block-out state in which the wearer's view of their external environment is completely blocked or obscured.

As will be described at greater length below, use cases of the AR glasses 100 with the lens system 104 in the opaque state include a sleep mode in which the AR glasses 100 serve as a form of sleep mask, facilitating rest or sleep at opportune times during wear. Additionally, visual media content can be played via the near-eye display while the screening mechanism 102 renders the lens system 104 opaque. This mode of operation is on occasion referred to herein as a cinema mode, in which the viewing experience of, for example, video content such as movies or sports events is greatly enhanced in that the screening mechanism 102 provides an opaque backdrop to the near-eye display, screening out visual distractions that would otherwise be the visual backdrop to the display, as is the case in the AR mode. Moreover, the significantly dimmed or blacked-out visual backdrop provided by the screening mechanism 102 in some examples increases perceived brightness of the near-eye display as compared to the AR mode, in which the display is backlit by ambient light.

In this example, the AR glasses 100 is further configured to be operable in a VR mode while the lens system 104 is in the opaque state, in this example more or less entirely blocking out ambient light. The display mechanism 106 in the VR mode displays virtual reality content set against a screened-out backdrop. It will be appreciated that the difference between the cinema mode and the VR mode is in this example lies in the nature of the content rendered by the display mechanism 106, with VR content typically uses stereoscopic effects to provide virtual environment having the appearance of depth. Note that the terms VR mode and AR mode are used herein to mean that the AR glasses 100 are in a configuration or optical state to provide AR and VR experiences respectively, but not necessarily that any display is provided. Thus, for example, when the lens system 104 is in the see-through state conventional to eyewear, the AR glasses 100 are considered for the purposes of this description to be in the AR mode, regardless of whether or not anything is presented via the near-eye display.

A body 108 of the AR glasses 100 includes a front piece or frame 112 and a pair of temples 114 hingedly connected to the frame 112 for supporting the frame 112 in position on a user's face when the temples 114 are in an extended or wearable configuration, as shown in FIG. 1. In some examples the entire frame 112 can be formed from a single piece of material so as to have a unitary or integral construction. The frame 112 is in this example embodiment at least partially provided by one or more substantially rigid molded components formed of a polymeric plastics material.

The lens system 104 is supported in typical eyewear-fashion by the frame 112 such that, during wear, the lens system 104 is positioned closely before the eyes, so that the wearer's field of view is occupied substantially completely by the lens system 104. During typical use and wear, the lens system 104 is transparent or semitransparent and the wearer thus views their environment through the transmissive optical elements that provide the lens system 104.

The lens system 104 comprises a bilateral pair of optical elements housed by the frame 112. In other words, the lens system 104 appears superficially to be provided by a pair of eyewear lenses mounted on the frame 112 in a corresponding pair of lens rims 116 located to the left- and righthand side of the frame 112. Each of these "lenses," however comprises a composite, multifunctional lens assembly 110 having a number of transmissive optical elements stacked and interconnected to serve not only the basic functions of conventional eyewear lenses, but additionally to provide or enable integrated display capabilities and dynamic optical screening functionalities. The lens assemblies 110 are mounted on the frame in the respective in respective lens rims 116 forming part of the frame 112.

The lens assemblies 110 are in this example non-corrective in collective effect, allowing light in the AR mode to pass therethrough substantially without distortion. The lens assemblies 110 are in this example substantially fully transparent during normal operation in the see-through state, when the AR glasses 100 are in the AR mode. In other examples, the AR glasses 100 are configured for outdoor use as sunglasses, so that the lens assemblies 110 are semi-transparent, filtering a noticeable portion of ambient light passing therethrough to provide a particular tint, while in conventional sunglass-fashion being functionally transparent. Note the that the lens assemblies 110 can in other examples be configured to have, in the AR mode at least, different optical effects and/or functionalities from the present example, for example being optically corrective or being shaped for special function such as ski goggles, and the like.

In this example, the optical screening mechanism 102 comprises, in each lens assembly 110, a respective pair of stacked polarizers that are movable relative to one another within the lens assembly 110 to vary orientation of their respective polarization axes. As the construction and operation of the stacked polarizers will most readily be appreciated in side view and from the wearer's perspective, these aspects of the screening mechanism 102 are described at greater length below with reference to FIG. 2A-FIG. 3B.

Nevertheless, it is briefly noted with respect to FIG. 1 that the pair of polarizers is in each lens assembly 110 provided by a static polarizer (being fixed in position relative to the frame 112 and lens rim 116), and a movable polarizer which is rotationally movable relative to the frame 112 (and hence relative to the static polarizer) about a rotational axis 120 more or less normal to lens assembly 110, thus broadly parallel to a user's viewing direction through the lens assembly 110 during wear. In this example, the static polarizer is provided by a polarized fixed lens 122 located closer to the viewer and rotationally fixed relative to the lens rim 116. Note that the fixed lens 122 can be a compound or composite lens arrangement. In this example, the polarizing function of the fixed lens 122 is provided by a polarized film 202 (see FIG. 2A) adhered to a front face of the fixed lens 122.

The movable polarizer in this example comprises a polarized filter 124 mounted in front of the fixed lens 122 (i.e., to that one of the major faces furthest from the wearer) for controlled part-rotational movement relative to the fixed lens 122 about its rotational axis 120.

Both the fixed lens 122 and the polarized filter 124 are in this example linear polarizers, being configured to limit wave oscillation of light passed therethrough to a single common plane referred to as its polarization axis. The fixed lens 122 accordingly has a fixed polarization axis 302 relative to the frame 112, and the polarized filter 124 has an adjustable polarization axis 304 (see, e.g., FIG. 3A and FIG. 3B).

The rotational range of the polarized filter 124 is in this example at least 90°, thus permitting positioning of the polarization axes 302, 304 relative to one another at respective extremes where they are parallel (FIG. 3A), obstructing no more light in combination than they would individually, or where they are perpendicular to one another, in combination blocking or screening out all ambient light and thus disposing the lens assembly 110 to a fully opaque state. The polarized filter 124 is in this example additionally capable of disposal in any relative angle between the extremes. It will be appreciated that proportion of light screened out by the combined pair of polarizers varies smoothly with change in relative angle, so that any opacity value between the fully opaque and maximally transmissive extremes is available by positioning the polarized filter 124 at the relative angle corresponding to the desired opacity level. The optical screening mechanism 102 of the lens assemblies 110 are thus configured to enable graduated variation in opacity of the lens system 104, The eyewear body 108 includes a pair of end portions 118 at opposite lateral extremities of the frame 112, the end portions 118 providing respective interior spaces in which at least part of onboard electronics 126 native to the AR glasses 100 are housed. In this example, a variety of electronic components is housed in one or both of the end portions 118. Some of the electronics 126 is also housed in the frame 112 and the temples 114. In some embodiments, the frame 112 is formed of a single piece of material, so as to have a unitary or monolithic construction. In this example embodiment, each end portion 118 is formed by a separate molded plastics component. In other examples the frame is metallic.

The onboard electronics 126 can include one or more processors with memory, wireless communication circuitry, and a power source. As discussed below with reference to FIG. 4, the electronics 126 comprises low-power circuitry, high-speed circuitry, and a display processor. Various other examples may include these elements in different configurations or integrated together in different ways. The electronics 126 additionally includes an on-board battery or other suitable portable power supply. The onboard electronics 126 can include a connector or port (not shown) suitable for charging the battery, a wireless receiver, transmitter or transceiver (not shown), or a combination of such devices.

The AR glasses 100 are camera-enabled, in this example comprising pair of cameras 128 mounted on the frame 112 and facing forwards so as to be aligned more or less with the direction of view of a wearer of the AR glasses 100. The cameras 128 are configured to capture digital photo as well as digital video content. Although two cameras are depicted, other examples contemplate the use of a single or additional (i.e., more than two) cameras. In one or more examples, the AR glasses 100 include any number of input sensors or other input/output devices in addition to the cameras 128. In this example, onboard sensors provided by the electronics 126 include, but is not limited to, biometric sensors, location sensors, and motion sensors and motion sensors.

The AR glasses 100 further includes one or more input and output mechanisms permitting communication with and control of various functionalities provided by the onboard electronics 126, including camera-, display-, and optical screening functionalities. In this example, the input mechanism comprises a pair of push buttons 130 mounted on the frame 112 so as to be accessible on top the respective end portions 118 for pressing by the user. Additional and/or alternative user input mechanisms may in other embodiments be provided by, for example, one or more touchpads for receiving haptic input, e.g., being located on one or both temples 114. Instead or in addition, some examples provide for control of one or more device functions by tap sequences applied manually to the body 108 of the AR glasses 100.

One of the buttons 130 in this example allows control of photo and video capture via the cameras 128. The other button 130 in this example serves as a manual input device of a selective control mechanism affording user-controlled adjustment and/or switching of the optical mode of the lens assemblies 110 via the screening mechanism 102.

Figure 2A:
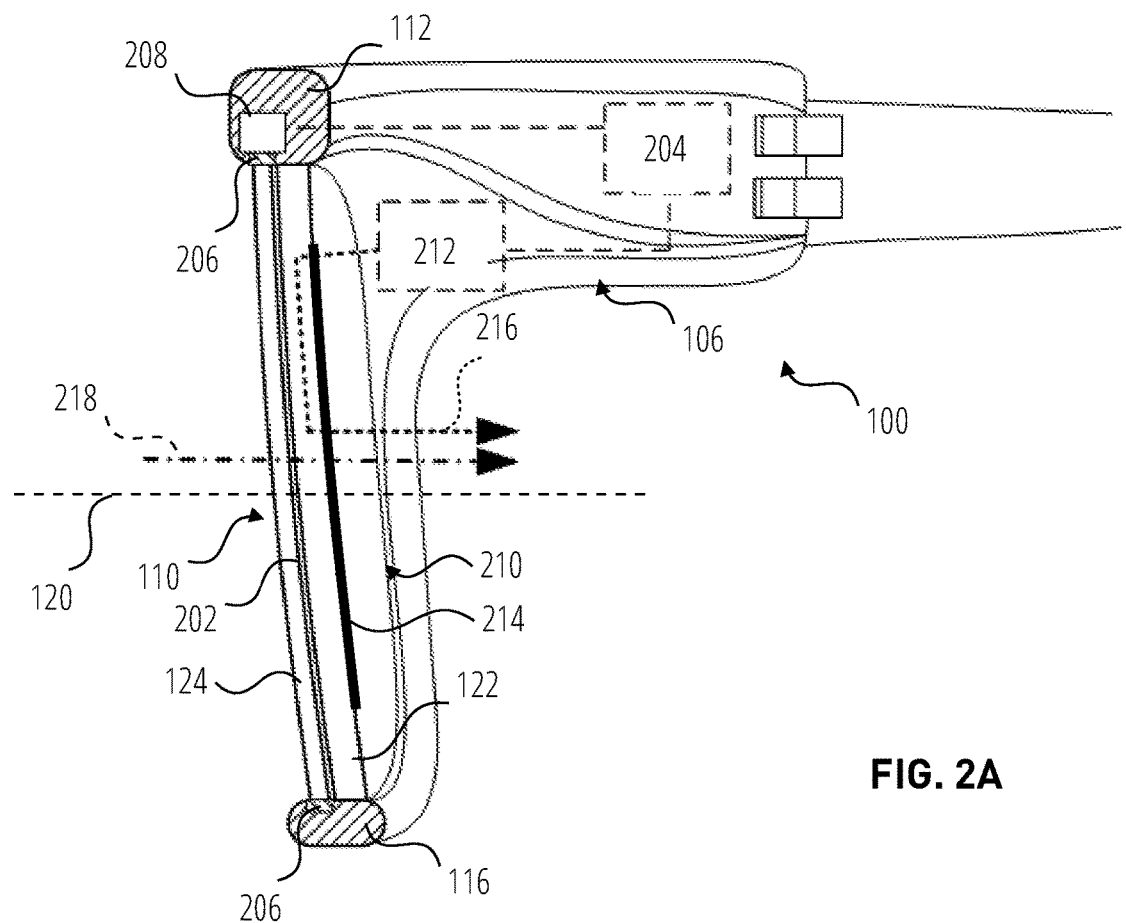
FIG. 2A is a schematic sectional side view of AR glasses such as that of FIG. 1, according to one example, the AR glasses being shown disposed in an AR mode in which a lens system of the AR glasses is in a see-through state.

Turning now to FIG. 2A, it can be seen that the screening mechanism 102 is in this example configured for powered alteration of opacity. In particular, the example AR glasses 100 includes an actuator in the example form of a step motor 208 housed in a top bar of the frame 112 and engaged with an annular rim ring 206 fixed to the radially outer periphery of the polarized filter 124 and mounted rotatably within the associated lens rim 116 and top bar of the frame 112. Thus, activation of the step motor 208 causes powered rotation of the rim ring 206, and therefore of the polarized filter 124, about its rotational axis 120. The step motor 208 and rim ring 206 are in this example engaged via meshed gear formations on the outer radius of the rim ring 206, but it will be appreciated that any suitable mechanical drive mechanism can be employed in other examples.

The button 130 for opacity control is in this example operatively connected to the step motor 208 via an opacity controller 204 provided by one more processors forming part of the onboard electronics 126. In some examples, operation of the opacity control button 130 is bimodal, with a single button press toggling the screening mechanism 102 between maximally transmissive and maximally opaque states. In this example, however, a user can select any opacity level between these extremes by means of a press-and-hold input responsive to which the polarized filter 124 is rotated smoothly, stopping at a desired angular position responsive to release of the button 130. In this manner, the user may optionally darken the lens assemblies 110 to adjust for ambient brightness, without rendering them functionally opaque, to allow use of the AR glasses 100 in the manner of sunglasses.

In this example, the opacity controller 204 is configured additionally to provide dynamic autonomous mode switching by operation of the step motor 208. To this end, the opacity controller 204 continuously monitors sensor and usage data, and responsive to identifying satisfaction of predefined criteria, autonomously activates the step motor 208 to switch the screening mechanism 102 from its see-through state to its opaque state, or vice versa. Further details regarding such autonomous opacity control are discussed below with reference to FIG. 6 and FIG. 7.

The display mechanism 106 is in this example provided by a near-eye display 210 integrated with the lens assemblies 110. In this example, the near-eye display 210 comprises a pair of laterally symmetrical forward optical assemblies housed in the respective end portions 118, each forward optical assembly comprising a projector 212 (see FIG. 2A-FIG. 3B) coupled with the fixed lens 122 of the associated lens assembly 110 to present visual imagery in a corresponding display area 214. Each lens assembly 110 thus has a dedicated projector 212 servicing a respective display area 214, as can best be seen in FIG. 3A.

In this example, the near-eye displays are provided with at least part of the fixed lens 122 serving as waveguide combiner. To this end, each fixed-lens waveguide has an input region and an output region provided by diffractive surface relief gratings, with the display areas 214 being defined by the corresponding surface relief gratings. The waveguides includes reflective or diffractive structures (e.g., gratings and/or optical elements such as mirrors, lenses, or prisms). Projected light 216 from the projector 212 thus enters the waveguide provided by the fixed lens 122 at the input region adjacent the periphery of the lens assembly 110, travels via the fixed lens 122 waveguide-fashion to encounter the diffractive structures defining the display area 214. The diffractive structures defining the display area 214 direct the projected light 216 towards a corresponding eye of the wearer, thus providing an image on or in the lens assembly 110 that overlays the view of the real world seen by the user. It will be appreciated that the display thus provided in the display area 214 is transparent, so the display is seen as overlaid on the visible environment.

It will be appreciated however that other display technologies or configurations may be provided that can display an image to a user in a forward field of view. For example instead of a projector 212 and a waveguide, an LCD, LED or other display panel or surface may be provided instead.

In FIG. 2A, the screening mechanism 102 is in its see-through state (corresponding to FIG. 3A below), in which respective polarization axes of the polarized filter 124 and the polarized film 202 on the fixed lens 122 are aligned, allowing the AR glasses 100 to operate in the AR mode. As shown by the schematic sectional side view of FIG. 2A, ambient light 218 in this state passes through the lens assembly 110 and on to the wearer's eye. Combined with projected light 216 from the display area 214 of the near-eye display, a view of the real world environment afforded by the ambient light 218 allows for the provision of AR experiences by the near-eye display.

Figure 2B:
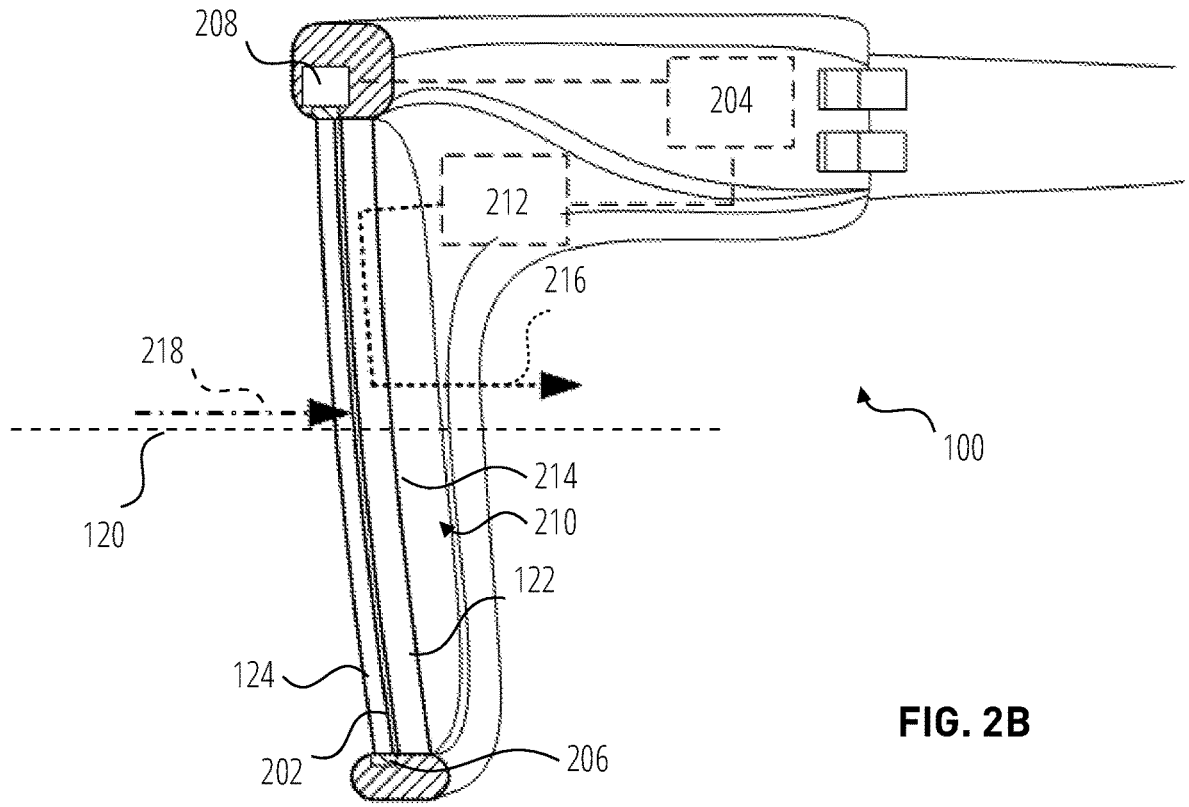
FIG. 2B is a view corresponding to that of FIG. 2A, the example AR glasses being shown disposed in a VR mode in which the lens system is in an opaque state, according to one example.

In contrast, FIG. 2B (corresponding to FIG. 3B) shows the screening mechanism 102 in an opaque state, with the AR glasses 100 operating a VR mode or a cinema mode as discussed earlier. In this state, the polarization axes of the polarized filter 124 and the polarized film 202 are normal to one another, blocking practically any ambient light 218 from passing therethrough. Ambient light 218 thus passes through the polarized filter 124, receiving a corresponding polarization. Upon impingement on the static polarizer provided by the polarized film 202, however, the polarized light is prevented from further passage. Projected light 216 passed on to the user via the display area 214 is thus visible to the wearer against an opaque, blacked-out visual backdrop.

It will be seen that objective intensity of the near-eye display 210 is unaffected by the optical state of the screening mechanism 102, as waveguide provided by the fixed lens 122 and the diffractive structures defining the display area 214 are located wholly in front of the polarizers of the screening mechanism 102, from the wearer's perspective.

Figure 3A:
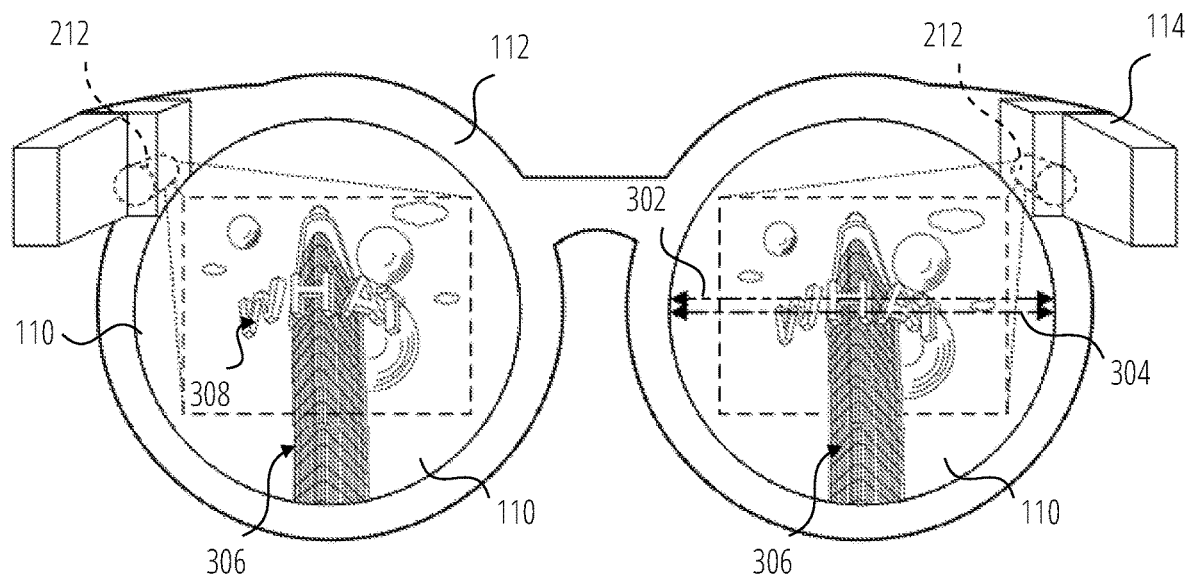
FIG. 3A shows a wearer's perspective view of the AR glasses of FIG. 2A, during operation of the glasses in the AR mode, according to one example.
Figure 3B:
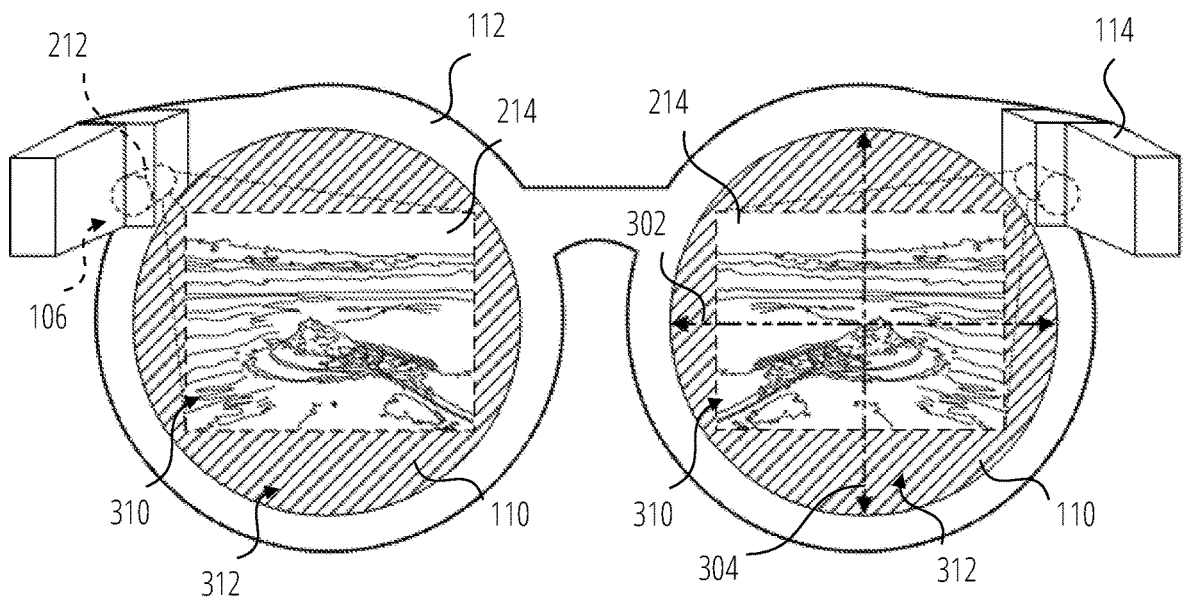
FIG. 3B shows a view corresponding to FIG. 3A, the AR glasses being disposed to the VR mode of FIG. 2B, according to one example.

FIG. 3A and FIG. 3B illustrate the AR glasses 100 from the perspective of a wearer during different operational modes in which the lens assemblies 110 is disposed to different optical conditions by operations of the screening mechanism 102 provided by the pair of stacked polarizers comprising, in this example, the polarized filter 124 and the polarized film 202. For clarity, a number of the elements shown in FIG. 1-FIG. 2B have been omitted. As described in FIG. 1, the lens assembly 110 of the AR glasses 100 comprise a laterally spaced pair of composite lens assemblies 110 secured within respective lens rims 116 provided by the frame 112.

In these views, a fixed polarization axis 302 provided by the polarized film 202 on the fixed lens 122 and an adjustable polarization axis 304 provided by the polarized filter 124 are for increased visibility shown beneath the respective lens assemblies 110, but it will be appreciated that these axes are coincident with the lens assemblies 110.

In particular, the view of FIG. 3A shows the AR glasses 100 in the AR mode (corresponding to FIG. 2A), during which the lens assembly 110 is in a see-through state, being transparent or semitransparent. The fixed polarization axis 302 and the adjustable polarization axis 304 are in this example parallel, filtering out no more ambient light 218 than would a single polarizer. The viewer thus has a substantially clear view of their real-world environment 306.

The near-eye display 210 is thus capable of rendering AR objects 308 that appear overlaid on the real-world environment 306. In this example, the AR objects 308 are rendered with stereoscopic effects in the left- and right display areas 214, so that they appear three-dimensional and located at depth with the ambient real-world environment 306. Visual content displayable by the near-eye display 210 in the AR mode is not limited to stereoscopic and/or overlaid AR content, but also includes conventional 2D material, e.g., graphical user interfaces, photos and video content such as movies, TV, sports event, and online video clips or social media stories.

In contrast, FIG. 3B shows the AR glasses 100 in a VR mode or a cinema mode during which the lens assembly 110 is in an opaque state while visual content in is presented in the display areas 214 via the near-eye display 210. In this example, the visual content displayed by the near-eye display 210 is conventional 2D video content 310 in the form of movie. It will be appreciated that a dark mode or sleep mode of the AR glasses 100 is in operation when the screening mechanism 102 is likewise in an optical blackout state, without anything being presented by the display mechanism 106.

The lens assembly 110 and screening mechanism 102 are in this example fully opaque, blocking out the passage of ambient light therethrough substantially completely. As shown schematically by the representative arrows in FIG. 3B, the adjustable polarization axis 304 and the fixed polarization axis 302 are orthogonal or at right angles to one another. In other embodiments, maximum opacity of the lens assembly 110 allows passage of at least some light therethrough but insufficiently so as to provide the wearer with a functionally clear view of their surroundings and thus being functionally opaque or nontransparent. It will also be appreciated that a VR mode or cinema mode such as in FIG. 3B can optionally be provided with the screening mechanism 102 blocking most, but not all, ambient light 218, at the discretion of the user.

Likewise, in instances where opacity levels between maximal transparency and maximal opacity is selectively achievable, as is the case in the present example, the AR mode of FIG. 3A may be operative with the ambient light 218 somewhat dimmed at the discretion of the user. This may be done for dimming of overly bright ambient conditions, or to increase perceived brightness of the near-eye display 210. Note that because (as best seen in FIG. 2B) the screening mechanism 102 blocks ambient light 218 behind the waveguide and display area 214 provided by the fixed lens 122 (as seen from the wearer's perspective) dimming of ambient light 218 by optical screening does not dim objective intensity of the near-eye display 210. For this reason, any dimming of ambient light 218 via the pair of polarizers increases the subjectively perceived intensity and therefore clarity of the display. The wearer can thus in some instances modulate or adjust display clarity by selective modification of lens opacity by operation of the screening mechanism 102.

When the screening mechanism 102 is in its fully opaque state (FIG. 3B), a visual lens assembly 110 to the near-eye display 210 is fully screened or blacked out. This permits provision of VR experiences via the near-eye display 210. Instead, the wearer may choose to view 2D non-AR visual content via the near-eye display 210 without any visual distraction in the visual lens assembly 110, as would be the case in the AR mode (FIG. 3A), when a real-world ambient environment is visible in the background.

System with Electronics-Enabled Eyewear

Figure 4:
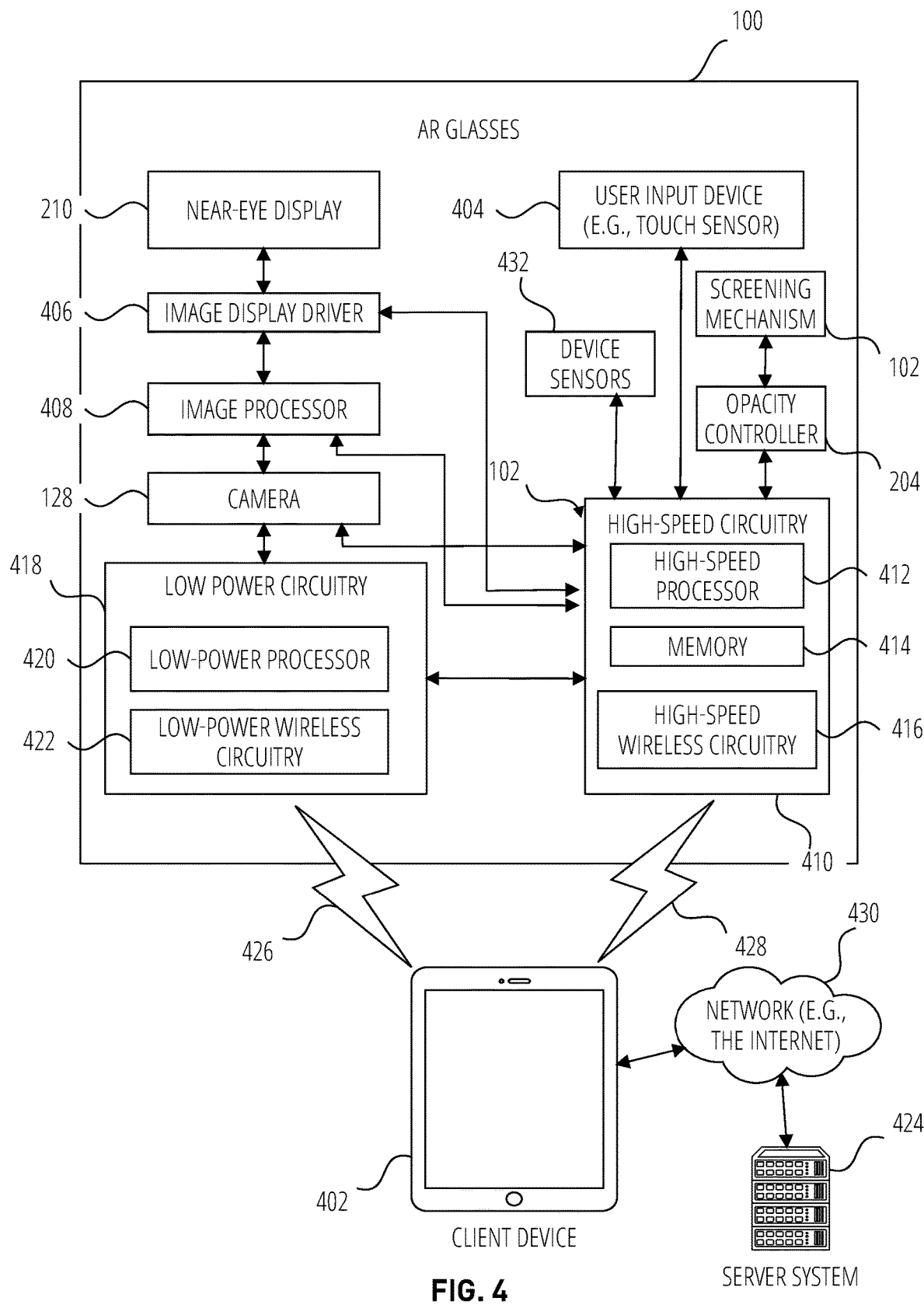
FIG. 4 is a block diagram illustrating a networked system including a wearable AR device such as that of FIG. 1, in accordance with one example.

FIG. 4 illustrates a system in which electronics-enabled eyewear such as the example AR glasses 100 can be implemented according to one example. FIG. 4 is a high-level functional block diagram of an example pair of AR glasses 100 communicatively coupled a mobile client device 402 and a server system 424 via various networks 430.

As discussed briefly previously, AR glasses 100 includes at one camera 128, a near-eye display 210, an optical screening mechanism 102, and an opacity controller 204 for autonomous control of the screening mechanism 102.

Client device 402 may be a smartphone, tablet, phablet, laptop computer, access point, or any other such device capable of connecting with the AR glasses 100 using either or both of a low-power wireless connection 426 and a high-speed wireless connection 428. Client device 402 is connected to server system 424 and network 430. The network 430 may include any combination of wired and wireless connections.

AR glasses 100 further includes two image displays of the near-eye display 210. The two image displays include one associated with the left lateral side and one associated with the right lateral side of the AR glasses 100. AR glasses 100 also includes image display driver 406, image processor 408, low power circuitry 418, and high-speed circuitry 410. Near-eye display 210 is configured for presenting images and videos, including an image that can include a graphical user interface to a user of the AR glasses 100.

Image display driver 406 commands and controls the image display of the near-eye display 210. Image display driver 406 may deliver image data directly to the image display of the near-eye display 210 for presentation or may have to convert the image data into a signal or data format suitable for delivery to the image display device. For example, the image data may be video data formatted according to compression formats, such as H. 264 (MPEG-4 Part 10), HEVC, Theora, Dirac, RealVideo RV40, VP8, VP9, or the like, and still image data may be formatted according to compression formats such as Portable Network Group (PNG), Joint Photographic Experts Group (JPEG), Tagged Image File Format (TIFF) or exchangeable image file format (Exif) or the like.

As noted above, AR glasses 100 includes a frame 112 and stems (or temples) extending from a lateral side of the frame 112. AR glasses 100 further includes one or more input devices 404, in this example including a touch sensor and push buttons 130. The user input device 404 (e.g., touch sensor or push button) is to receive from the user an input selection to manipulate the graphical user interface of the presented image.

The components shown in FIG. 4 for the AR glasses 100 are located on one or more circuit boards, for example a PCB or flexible PCB, in the rims or temples. Alternatively or additionally, the depicted components can be located in the chunks, frames, hinges, or bridge of the AR glasses 100. Left and right cameras 128 can include digital camera elements such as a complementary metal-oxide-semiconductor (CMOS) image sensor, charge coupled device, or any other respective visible or light capturing elements that may be used to capture data, including images of scenes with unknown objects.

AR glasses 100 includes a memory 414 which stores instructions to perform a subset or all of the functions described herein. Memory 414 can also include storage device. Memory 414 in this example stores instructions for dynamic autonomous mode switching, implementing the opacity controller 204 via execution of the instructions by high-speed circuitry 410.

As shown in FIG. 4, high-speed circuitry 410 includes high-speed processor 412, memory 414, and high-speed wireless circuitry 416. In the example, the image display driver 406 is coupled to the high-speed circuitry 410 and operated by the high-speed processor 412 in order to drive the left and right image displays of the near-eye display 210. High-speed processor 412 may be any processor capable of managing high-speed communications and operation of any general computing system needed for AR glasses 100. High-speed processor 412 includes processing resources needed for managing high-speed data transfers on high-speed wireless connection 428 to a wireless local area network (WLAN) using high-speed wireless circuitry 416. In certain examples, the high-speed processor 412 executes an operating system such as a LINUX operating system or other such operating system of the AR glasses 100 and the operating system is stored in memory 414 for execution. In addition to any other responsibilities, the high-speed processor 412 executing a software architecture for the AR glasses 100 is used to manage data transfers with high-speed wireless circuitry 416. In certain examples, high-speed wireless circuitry 416 is configured to implement Institute of Electrical and Electronic Engineers (IEEE) 902.11 communication standards, also referred to herein as Wi-Fi. In other examples, other high-speed communications standards may be implemented by high-speed wireless circuitry 416.

Low-power wireless circuitry 422 and the high-speed wireless circuitry 416 of the AR glasses 100 can include short range transceivers (Bluetooth™) and wireless wide, local, or wide area network transceivers (e.g., cellular or WiFi). Client device 402, including the transceivers communicating via the low-power wireless connection 426 and high-speed wireless connection 428, may be implemented using details of the architecture of the AR glasses 100, as can other elements of network 430.

Memory 414 includes any storage device capable of storing various data and applications, including, among other things, camera data generated by the left and right cameras 128, opacity controller 204, and the image processor 408, as well as images generated for display by the image display driver 406 on the image displays of the near-eye display 210. While memory 414 is shown as integrated with high-speed circuitry 410, in other examples, memory 414 may be an independent standalone element of the AR glasses 100. In certain such examples, electrical routing lines may provide a connection through a chip that includes the high-speed processor 412 from the image processor 408 or low-power processor 420 to the memory 414. In other examples, the high-speed processor 412 may manage addressing of memory 414 such that the low-power processor 420 will boot the high-speed processor 412 any time that a read or write operation involving memory 414 is needed.

As shown in FIG. 4, the low-power processor 420 or high-speed processor 412 of the AR glasses 100 can be coupled to the camera 128, screening mechanism 102 (which in this example includes the step motor 208, the low-power processor 420 and/or high-speed processor 412 thus at least in part providing the opacity controller 204), the image display driver 406, the user input device 404 (e.g., touch sensor or push button), and the memory 414.

AR glasses 100 is connected with a host computer. For example, the AR glasses 100 is paired with the client device 402 via the high-speed wireless connection 428 or connected to the server system 424 via the network 430. Server system 424 may be one or more computing devices as part of a service or network computing system, for example, that include a processor, a memory, and network communication interface to communicate over the network 430 with the client device 402 and AR glasses 100.

The client device 402 includes a processor and a network communication interface coupled to the processor. The network communication interface allows for communication over the network 430, low-power wireless connection 426 or high-speed wireless connection 428. Client device 402 can further store at least portions of the instructions for autonomous and/or user-directed opacity control functionalities via the optical screening mechanism 102 described herein. Thus, in some examples, opacity control may be performed entirely on-device at the AR glasses 100. In other embodiments, at least part of the opacity controller 204 may be provided by the connected client device 402. In one such embodiment, the client device 402 has installed thereon a Machine-Learning Model (ML Model) derived from a neural network trained with use-case training data pertaining to sensor date and use-case data in which optical screening is appropriate or was manually/selective implemented by users. The ML model in such cases autonomously triggers switching of the screening mechanism 102 and hence the lens assemblies 110 between different optical modes as described herein and as discussed briefly with reference to FIG. 7 below. In some embodiments, such an ML model may be implemented by an on-device opacity controller 204. In yet further embodiments, autonomous opacity control may be provided at least in part by the server system 424, e.g., by use of a continuously updated AI system implemented by the server system 424 to control multiple AR glasses 100 in communication therewith via the network 430.

Output components of the AR glasses 100 include visual components, such as a the near-eye display 210 and/or a light emitting diode (LED) display. The image displays of the near-eye display 210 are driven by the image display driver 406. The output components of the AR glasses 100 further include acoustic components (e.g., speakers), haptic components (e.g., a vibratory motor), other signal generators, and so forth. The input components of the AR glasses 100, the client device 402, and server system 424, such as the user input device 404, may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., the buttons 130, a touch screen that provides location and force of touches or touch gestures, or other tactile input components), audio input components (e.g., a microphone), and the like.

AR glasses 100 may optionally include additional peripheral device elements. Such peripheral device elements may include on-board device sensors 432, in this example including biometric sensors, motion sensors, and location sensors integrated with AR glasses 100. For example, peripheral device elements may include any I/O components including output components, motion components, position components, or any other such elements described herein.

For example, the biometric components of the device sensors 432 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components of the device sensors 432 include acceleration sensor components (e.g., accelerometer), gravitation sensor components, rotation sensor components (e.g., gyroscope), and so forth. The position components include location sensor components to generate location coordinates (e.g., a Global Positioning System (GPS) receiver component), WiFi or Bluetooth™ transceivers to generate positioning system coordinates, altitude sensor components (e.g., altimeters or barometers that detect air pressure from which altitude may be derived), orientation sensor components (e.g., magnetometers), and the like. Such positioning system coordinates can also be received over low-power wireless connections 426 and high-speed wireless connection 428 from the client device 402 via the low-power wireless circuitry 422 or high-speed wireless circuitry 416.

Where a phrase similar to "at least one of A, B, or C," "at least one of A, B, and C," "one or more A, B, or C," or "one or more of A, B, and C" is used, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Changes and modifications may be made to the disclosed embodiments without departing from the scope of the present disclosure. These and other changes or modifications are intended to be included within the scope of the present disclosure, as expressed in the following claims.

Networked Computing Environment

Figure 5:
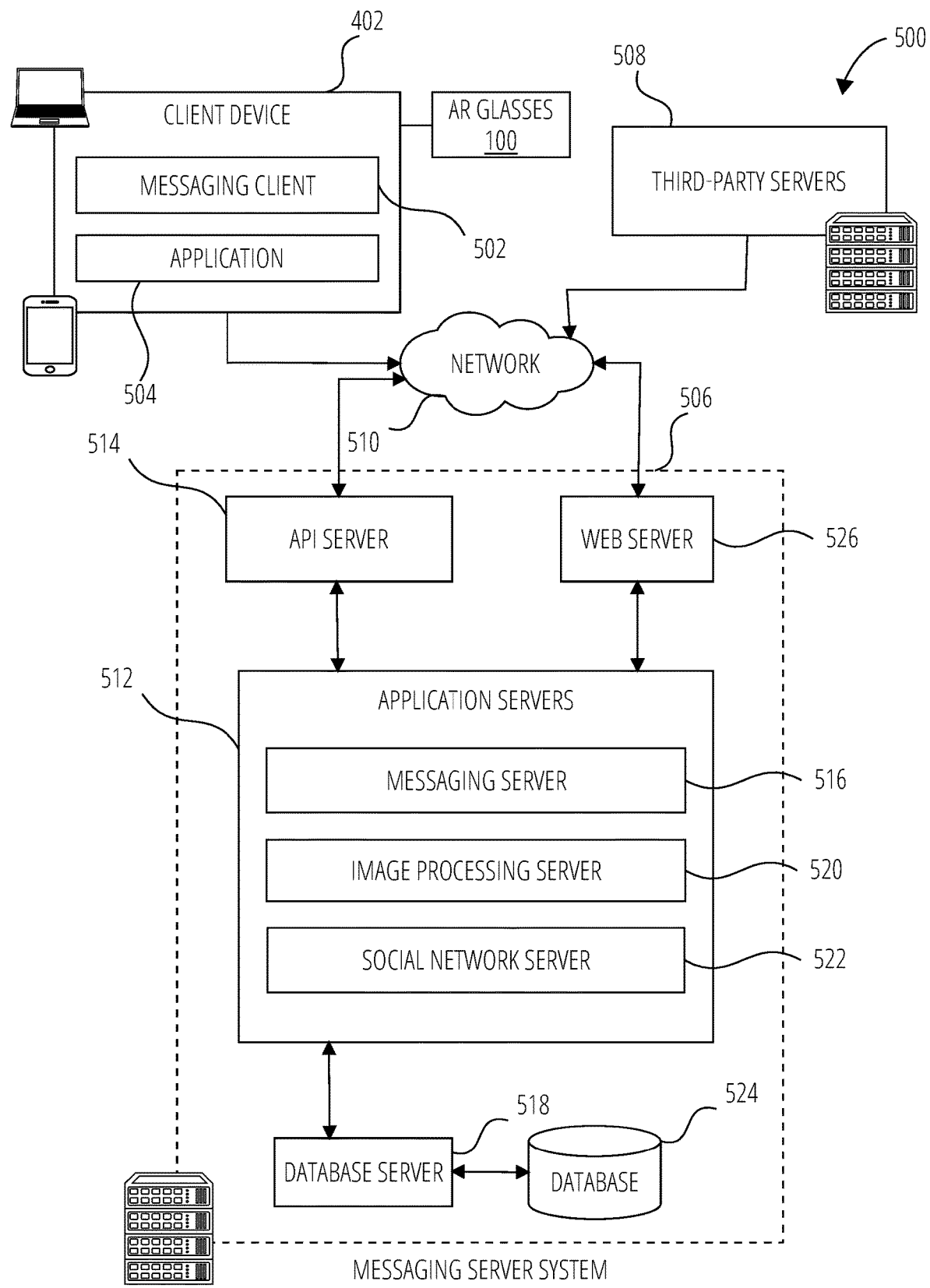
FIG. 5 is a diagrammatic representation of a networked environment in which the present disclosure may be deployed, in accordance with some examples.

FIG. 5 is a block diagram showing an example messaging system 500 for exchanging data (e.g., messages and associated content) over a network. The messaging system 500 includes multiple instances of a client device 402 analogous to that exemplified with reference to FIG. 4, each of which hosts a number of applications, including a messaging client 502 and other applications 504. In this example, the client device 402 is a mobile phone coupled to a pair of AR glasses 100 similar to that describe 3d with reference to FIG. 1-FIG. 4. In other examples, the client device 402 may be provided by the AR glasses 100 themselves.

Each messaging client 502 is communicatively coupled to other instances of the messaging client 502 (e.g., hosted on respective other client devices 402), a messaging server system 506 and third-party servers 508 via a network 510 (e.g., the Internet). A messaging client 502 can also communicate with locally-hosted applications 504 using Applications Program Interfaces (APIs). In some examples, the messaging client 502 can be provided by a wearable device such as the AR glasses 100 of FIG. 1, a client device 402 such as that of FIG. 4, or a combination thereof.

A messaging client 502 is able to communicate and exchange data with other messaging clients 502 and with the messaging server system 506 via the network 510. The data exchanged between messaging clients 502, and between a messaging client 502 and the messaging server system 506, includes functions (e.g., commands to invoke functions) as well as payload data (e.g., text, audio, video or other multimedia data).

The messaging server system 506 provides server-side functionality via the network 510 to a particular messaging client 502. While certain functions of the messaging system 500 are described herein as being performed by either a messaging client 502 or by the messaging server system 506, the location of certain functionality either within the messaging client 502 or the messaging server system 506 may be a design choice. For example, it may be technically preferable to initially deploy certain technology and functionality within the messaging server system 506 but to later migrate this technology and functionality to the messaging client 502 where a client device 402 has sufficient processing capacity.

The messaging server system 506 supports various services and operations that are provided to the messaging client 502. Such operations include transmitting data to, receiving data from, and processing data generated by the messaging client 502. This data may include message content, client device information, geolocation information, media augmentation and overlays, message content persistence conditions, social network information, and live event information, as examples. Data exchanges within the messaging system 500 are invoked and controlled through functions available via user interfaces (UIs) of the messaging client 502.

Turning now specifically to the messaging server system 506, an Application Program Interface (API) server 514 is coupled to, and provides a programmatic interface to, application servers 512. The application servers 512 are communicatively coupled to a database server 518, which facilitates access to a database 524 that stores data associated with messages processed by the application servers 512. Similarly, a web server 526 is coupled to the application servers 512, and provides web-based interfaces to the application servers 512. To this end, the web server 526 processes incoming network requests over the Hypertext Transfer Protocol (HTTP) and several other related protocols.

The Application Program Interface (API) server 514 receives and transmits message data (e.g., commands and message payloads) between the client device 402 and the application servers 512. Specifically, the Application Program Interface (API) server 514 provides a set of interfaces (e.g., routines and protocols) that can be called or queried by the messaging client 502 in order to invoke functionality of the application servers 512. The Application Program Interface (API) server 514 exposes various functions supported by the application servers 512, including account registration, login functionality, the sending of messages, via the application servers 512, from a particular messaging client 502 to another messaging client 502, the sending of media files (e.g., images or video) from a messaging client 502 to a messaging server 516, and for possible access by another messaging client 502, the settings of a collection of media data (e.g., story), the retrieval of a list of friends of a user of a client device 402, the retrieval of such collections, the retrieval of messages and content, the addition and deletion of entities (e.g., friends) to an entity graph (e.g., a social graph), the location of friends within a social graph, and opening an application event (e.g., relating to the messaging client 502).

The application servers 512 host a number of server applications and subsystems, including for example a messaging server 516, an image processing server 520, and a social network server 522. The messaging server 516 implements a number of message processing technologies and functions, particularly related to the aggregation and other processing of content (e.g., textual and multimedia content) included in messages received from multiple instances of the messaging client 502. As will be described in further detail, the text and media content from multiple sources may be aggregated into collections of content (e.g., called stories or galleries). These collections are then made available to the messaging client 502. Other processor and memory intensive processing of data may also be performed server-side by the messaging server 516, in view of the hardware requirements for such processing.

The application servers 512 also include an image processing server 520 that is dedicated to performing various image processing operations, typically with respect to images or video within the payload of a message sent from or received at the messaging server 516.

The social network server 522 supports various social networking functions and services and makes these functions and services available to the messaging server 516. To this end, the social network server 522 maintains and accesses an entity graph within the database 524. Examples of functions and services supported by the social network server 522 include the identification of other users of the messaging system 500 with which a particular user has relationships or is "following," and also the identification of other entities and interests of a particular user.

Returning to the messaging client 502, features and functions of an external resource (e.g., an application 504 or applet) are made available to a user via an interface of the messaging client 502. In this context, "external" refers to the fact that the application 504 or applet is external to the messaging client 502. The external resource is often provided by a third party but may also be provided by the creator or provider of the messaging client 502. The messaging client 502 receives a user selection of an option to launch or access features of such an external resource. The external resource may be the application 504 installed on the client device 402 (e.g., a "native app"), or a small-scale version of the application (e.g., an "applet") that is hosted on the client device 402 or remote of the client device 402 (e.g., on third-party servers 508). The small-scale version of the application includes a subset of features and functions of the application (e.g., the full-scale, native version of the application) and is implemented using a markup-language document. In one example, the small-scale version of the application (e.g., an "applet") is a web-based, markup-language version of the application and is embedded in the messaging client 502. In addition to using markup-language documents (e.g., a .*ml file), an applet may incorporate a scripting language (e.g., a .*js file or a .json file) and a style sheet (e.g., a .*ss file).

In response to receiving a user selection of the option to launch or access features of the external resource, the messaging client 502 determines whether the selected external resource is a web-based external resource or a locally-installed application 504. In some cases, applications 504 that are locally installed on the client device 402 can be launched independently of and separately from the messaging client 502, such as by selecting an icon, corresponding to the application 504, on a home screen of the client device 402. Small-scale versions of such applications can be launched or accessed via the messaging client 502 and, in some examples, no or limited portions of the small-scale application can be accessed outside of the messaging client 502. The small-scale application can be launched by the messaging client 502 receiving, from a third-party server 508 for example, a markup-language document associated with the small-scale application and processing such a document.

In response to determining that the external resource is a locally-installed application 504, the messaging client 502 instructs the client device 402 to launch the external resource by executing locally-stored code corresponding to the external resource. In response to determining that the external resource is a web-based resource, the messaging client 502 communicates with the third-party servers 508 (for example) to obtain a markup-language document corresponding to the selected external resource. The messaging client 502 then processes the obtained markup-language document to present the web-based external resource within a user interface of the messaging client 502.

The messaging client 502 can notify a user of the client device 402, or other users related to such a user (e.g., "friends"), of activity taking place in one or more external resources. For example, the messaging client 502 can provide participants in a conversation (e.g., a chat session) in the messaging client 502 with notifications relating to the current or recent use of an external resource by one or more members of a group of users. One or more users can be invited to join in an active external resource or to launch a recently-used but currently inactive (in the group of friends) external resource. The external resource can provide participants in a conversation, each using respective messaging clients 502, with the ability to share an item, status, state, or location in an external resource with one or more members of a group of users into a chat session. The shared item may be an interactive chat card with which members of the chat can interact, for example, to launch the corresponding external resource, view specific information within the external resource, or take the member of the chat to a specific location or state within the external resource. Within a given external resource, response messages can be sent to users on the messaging client 502. The external resource can selectively include different media items in the responses, based on a current context of the external resource.

The messaging client 502 can present a list of the available external resources (e.g., applications 504 or applets) to a user to launch or access a given external resource. This list can be presented in a context-sensitive menu. For example, the icons representing different ones of the application 504 (or applets) can vary based on how the menu is launched by the user (e.g., from a conversation interface or from a non-conversation interface).

Example Methods

Figure 6:
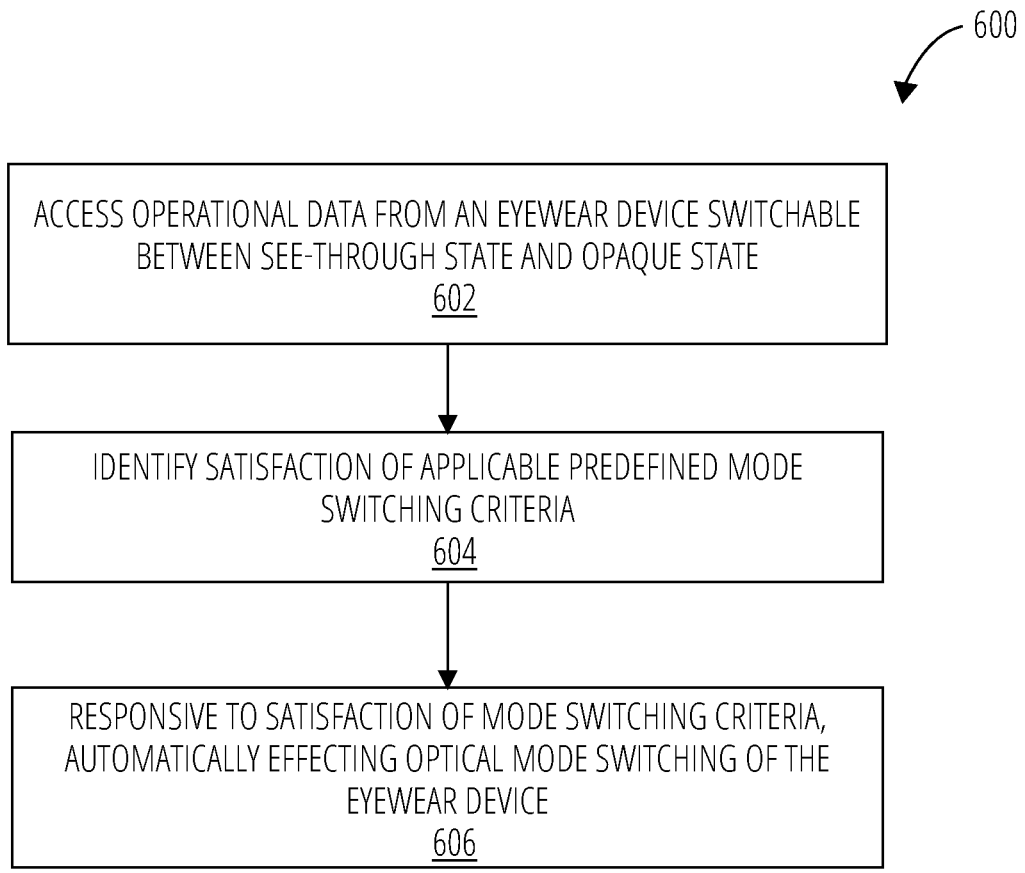
FIG. 6 is a high-level flowchart schematically illustrating a method 600 for dynamic autonomous control of an operational mode of an AR enabled headwear device, according to one example.

FIG. 6 is a high-level flow diagram of a method 600 for autonomous control of an optical state or operational mode of an electronics-enabled eyewear device with an optical screening mechanism, according to one example. The method will further be described with reference to the example AR glasses 100 of FIG. 1-FIG. 4, but it will be appreciated that the techniques described can in other instances be implemented with different example devices.

FIG. 6 In operation 602, operational data is accessed from an electronics-enabled eyewear device (e.g., AR glasses 100) having an optical system (e.g., lens assemblies 110) that is switchable between different optical states comprising, at least (a) a see-through state (e.g., FIG. 2A and FIG. 3A) and (b) an opaque state (e.g., FIG. 2B and FIG. 3B) in which a wearer's view of their environment is obscured by the lens assembly. The operational data comprises a current optical state of the optical system and sensor data captured by one or more sensors (e.g., device sensors 432) integrated in the eyewear device. The method 600 further comprises identifying, at operation 604, while the lens assembly is in a first one of its optical states (e.g., see-through), satisfaction of predefined mode switching criteria applicable to the first optical state (e.g., that the wearer is lying down and has fallen asleep or has their eyes closed). At operation 606, responsive to satisfaction of the applicable mode switching criteria, the method comprises automatically effecting disposal of the optical system from the first optical state to a second, different one of the optical states of the lens assembly (e.g., switching the lens assemblies 110 to fully opaque for operation of the device as a sleep mask).

Figure 7:
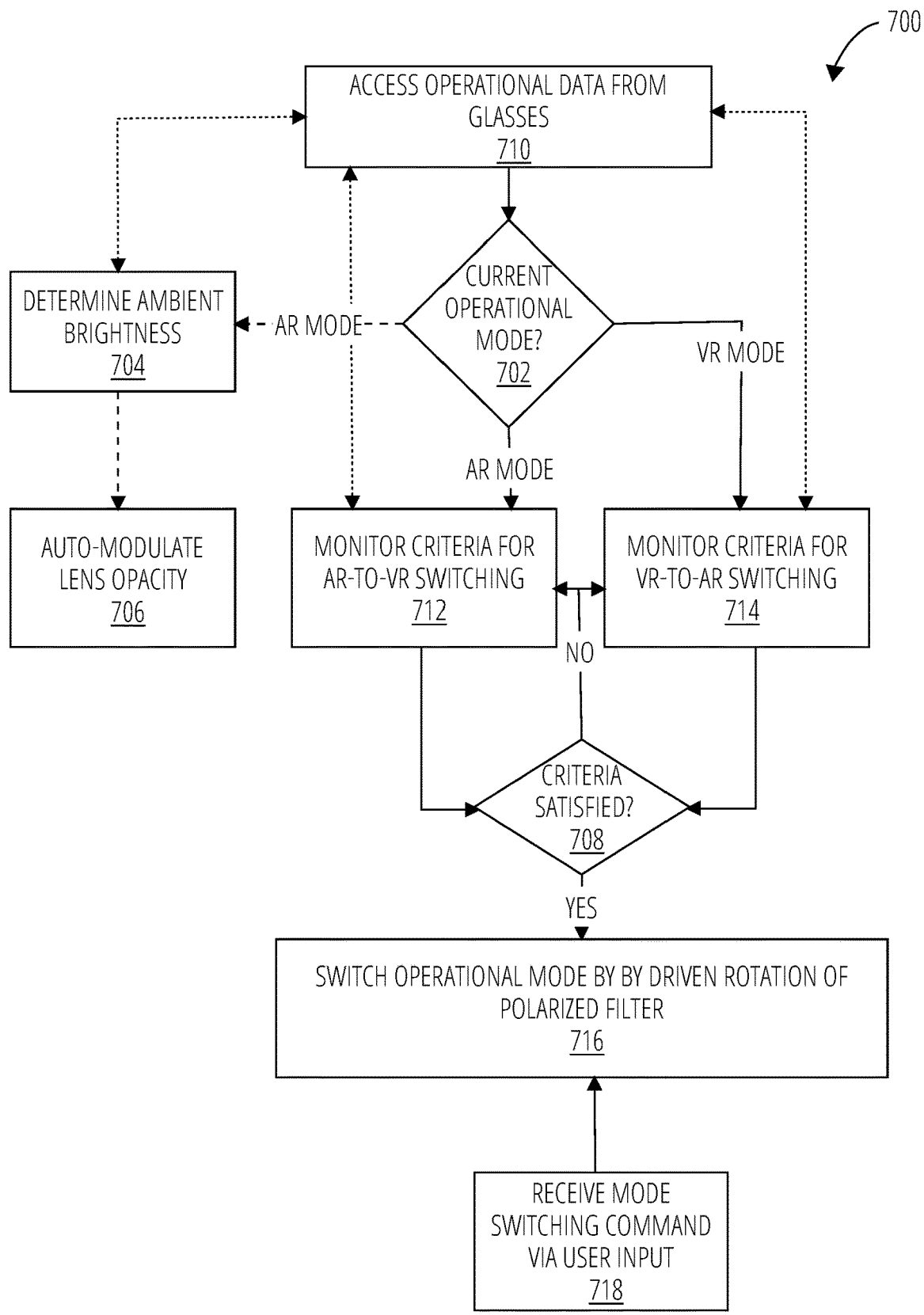
FIG. 7 is a flowchart which schematically illustrates a flowchart 700 for dynamic autonomous control of an operational mode of an AR enabled eyewear device consistent with the example AR glasses of FIG. 1, according to one example.

At operation 710 Turning now to FIG. 7, flowchart 700 schematically illustrates a more detailed method of operating an eyewear device, according to some examples. For ease of reference, the method of FIG. 7 will further be described as being performed by AR glasses 100 consistent with the examples illustrated by FIG. 1-FIG. 4, but it will be appreciated that differently configured eyewear devices can be used in the performance of analogous methods, in other examples. Moreover, the operations of flowchart 700 are in this example performed by on-board electronics 126 of the AR glasses 100, and in particular by opacity controller 204, but can in other embodiments be performed at least in part by a coupled client device 402 (FIG. 4) and/or server system 424. In some examples, a machine-learning model (ML model) by which at least some autonomous decision-making operations can in some operations be executed may be implemented, at least partially, server-side, e.g. by server system 424.

In operation 702, the opacity controller 204 (or in other example, off-board decision-making circuitry) accesses current or live operational data of the AR glasses 100. Such operational data in this example includes:
  a. usage data from the glasses 100 (e.g.: whether or not any visual content is being displayed using by the near-eye display 210 and, if so, the type of visual content currently displayed; the current optical state or mode of the lens system 104, e.g., opaque or at least partially transparent; and the like); and
  b. sensor data captured by the integrated onboard device sensors 432 (e.g., motion data, biometric data, processed data from where-facing cameras to determine whether the wearer's eyes are open or closed, geo-location data, and the like).

At operation 702, the current operational data is processed to determine the current operational mode of the AR glasses 100. In this example, the AR glasses 100 are bimodal, being operable either in an AR mode (in which the screening mechanism renders the lens assemblies transparent or at least semitransparent; see for example FIG. 2A or FIG. 3A) or in a VR mode (in which the polarization axes 302, 304 of the polarized filter 124 and the fixed lens 122 are more or less normal to each other, rendering the lens assemblies 110 functionally opaque; see, for example. FIG. 2B or FIG. 3B).

If, at operation 702, it is determined that the AR glasses 100 are currently in the AR mode, then, at operation 712, the opacity controller continually monitors operational data from the AR glasses 100 to identify satisfaction of criteria for switching the AR glasses 100 from the AR mode to the VR mode (referred to further for ease of reference as AR-VR switching). If, the other hand, it is determined at operation 702 that the glasses are currently in the VR mode then, at operation 714, the opacity controller continually monitors the operational data to identify satisfaction of criteria from switching the AR glasses 100 from the VR mode to the AR mode (referred to further for ease of reference as VR-AR switching). Note that the applicable mode-switching criteria for AR-VR switching is different from the applicable mode-switching criteria for VR-AR switching. This is because the conditions in which vision is autonomously to be occluded is typically different from conditions in which unimpeded vision is advisable or imperative.

In this example, a number of predefined distinct sets of AR-VR switching criteria (all of which are to be satisfied) are provided. In particular, the AR-VR switching is in this example configured to automatically switch the lens system from its see-through state (FIG. 3A) to its opaque state (FIG. 3B) in two different scenarios that are identifiable from the glasses operational data, namely:
  a. using the integrated near eye display of the glasses to watch non-AR visual content (e.g.: in cinema mode to watch a movie, a sports event, or the like; or in VR mode, in which a VR experience as provided) while the wearer is stationary or non-ambulatory (i.e., being seated or recumbent/lying down); and
  b. employing the AR glasses 100 as a sleep mask or shield, in which the screening mechanism 102 renders the lens system 104 fully opaque without any visual content being reproduced by the near-eye display 210.

In some examples, the mode switching criteria is in each case explicitly defined as a set of respective variables or parameters with associated threshold values, satisfaction of each being required to effect autonomous mode switching. Instead, or in combination, autonomous mode switching is in some examples implemented using a machine learning model (ML model) by operation of which satisfaction of at least some mode switching criteria are identified based on the current operational data. For example, identification of an activity state of the wearer can in cases be determined non-linearly by the ML model, while other combinatory criteria (such as display activity) may be determined in by the opacity controller 204, with consideration of these facts in combination determining autonomous opacity control via the screening mechanism 102. Examples of such ML model determined behavior states include whether the wearer have fallen asleep or intend to go to sleep, have gone to bed, is rising after rest, is seated or otherwise stationary in a transit environment while viewing non-AR visual content, and the like.

For example, criteria for mode-switching to sleep mode in one example provides that:
  i. the wearer be recumbent (e.g., being prone or lying down) as indicated by orientation sensors of the AR glasses 100;
  ii. the wearer is resting (as indicated by below-threshold motion data and/or by biometric sensor data); and
  iii. the wearer has not actively selected to display visual content via the integrated near-eye display 210.

Similarly, the criteria for VR-AR switching, at operation 714, in this example comprises that:
  i. the AR glasses 100 are currently in sleep mode, the lens assemblies 110 being fully occluded by the screening mechanism 102 while near-eye display 210 is inactive;
  ii. biometric sensor data from the AR glasses 100 indicates that the wearer is awakening according to pre-defined parameter thresholds or ML-model assessment; and
  iii. motion data from the AR glasses 100 indicates that the user is rising according to pre-defined parameter thresholds or ML-model assessment;
  OR
  i. that the AR glasses 100 are currently in cinema mode, the lens assemblies 110 being currently occluded while the wearer is seated and actively watching a movie via the near-eye display 210;
  ii. the movie is coming to its conclusion; and
  iii. the wearer is rising.

OR i. that the AR glasses 100 are currently in cinema mode, the lens assemblies 110 being currently occluded while the wearer actively watching a movie via the near-eye display 210;
ii. the wearer is stationary within a mass transit vehicle; and
iii. the vehicle is arriving at the wearer's destination.

It will be appreciated that the above-provided examples are non-exhaustive and that a variety of different mode switching criteria can be employed in other examples. Thus, if the applicable mode switching criteria are satisfied, at decision operation 708, then the screening mechanism 102 of the AR glasses 100 is switched, at operation 716, to the opposite optical state, i.e., switching the screening mechanisms 102 from the opaque state to the see-through state, or vice versa, depending on the currently active optical mode.

After mode switching, at operation 716, the opacity controller 204 resumes monitoring of the operational data from the AR glasses 100, at operation 712 or operation 714, as the case may be, to identify satisfaction of the newly applicable mode switching criteria specific to the particular optical mode to which the AR glasses were most recently switched. Note that, in this example, the wearer can at any time provide a manual or selective command to switch the optical state of the lens system 104. In this example embodiment, a single press of the left push button 130 causes the screening mechanism 102 to change the optical state of the lens assemblies 110 from their current optical mode to the opposite optical mode. Thus, when the lens assemblies 110 are blacked out, a single press on the left push button 130 causes actuated rotation of the polarized filters 124 to switch the lens assemblies 110 to the see-through state, and vice versa. In other examples, mode switching commands can instead or in addition be provided via a linked mobile device, such as client device 402 of FIG. 4.

In this example, a press-and-hold operation of the left push button 130 enables selective graduated opacity control by causing continuous driven rotation of the polarized filters 124 until release of the button 130. In this manner, the user can adjust the opacity of the lens assemblies 110 to suit their personal situational preference.

Note that in all of the above examples, the screening mechanism 102 of the left and right lens assemblies 110 are linked by their respective step motors 208 for synchronous opacity equalization, so that the opacity values of the left and right lens assemblies stay equal to one another throughout. In other examples, such as those described with reference to FIG. 8A through FIG. 8C, the rotation mechanisms of the polarized filters 124 are mechanically linked, so that manual or actuated adjustment of the rotational position of one of the polarized filters 124 is automatically mirrored by the other polarized filter 124.

In addition, some examples of both AR glasses and non-AR smart glasses provide dynamic autonomous opacity regulation or modulation responsive to ambient brightness levels, while remaining in the see-through or semitransparent state. In this manner, the screening mechanism 102 effectively provides for dynamic auto-modulated sunglass-style tint levels of the lens assemblies 110, facilitating multifunctional use of the AR glasses 100. The AR glasses 100 has incorporated therein one example of such a tint modulation system, constituted by the opacity controller 204 dynamically regulating the rotational position of the polarized filter 124 to regulate a composite opacity level or tint level of the lens system 104.

At operation 704, the opacity controller 204 continually determines, while the AR glasses 100 are in the AR mode, an ambient brightness value experienced by the AR glasses 100 based on the operational data received at operation 710. In this example, ambient brightness is indicated by a current or most recent reading by a light meter incorporated in the eyewear body. In some examples in which no native light meter is provided, ambient brightness levels is calculated by processing contemporaneous image data captured by the camera 128.

If the user has selectively enabled active tint modulation (e.g., via a linked mobile phone application), the opacity controller 204 at operation auto-modulates lens tint levels by dynamically and automatically adjusting, if necessary, the opacity level of the screening mechanism through driven rotation of the polarized filter to a corresponding angular position relative to the rotational axis 120. In this example, the user can pre-select a target light value or brightness level to be maintained from the wearer's perspective, with the screening mechanism 102 in conditions brighter that the target level being dynamically regulated to filter out that amount of ambient light necessary achieve the target light value for the wearer.

It will be appreciated that the active tint modulation provided by the pair of polarizers of the screening mechanisms 102 is far superior in responsive in available screening range and in response time (being practically instantaneous) to conventional techniques for providing variable tint sunglass lenses.

Note that the above-described techniques for controlling opacity (i.e., optical transmissivity) of a head-mounted lens system can in other examples be employed in non-AR devices, in non-eyewear devices, in non-smart devices, and/or in any feasible combination of these.

Thus, for instance, one example provides for a VR headset (e.g., a head-mounted device configured for a fully immersive experience by occupying the wearer's full field of view entirely with a near eye display. Although such devices are head-mounted and provide a near-eye display to the wearer, they are not configured or suitable for wear in outdoor and/or uncontrolled real-life environments and are thus not eyewear devices, consistent with the common meaning of the phrase as used herein. Provision of a adjustable stacked-polarizer screening mechanism integrated in a lens system of an example VR headset provides the functionality of rapidly switching the headset from VR functionality to AR functionality, by switching the lens system from an opaque state to a see-through state. Thus, when a VR user wishes to end their VR experience or need urgently to view their environment, the lens system of the VR headset can readily be rendered functionally transparent instead of physically removing the headset.

In some examples, such a variable-opacity headset provides AR functionality when its lens system is in the see-through mode, e.g. providing an AR user interface for the headset and/or for one or more wirelessly linked devices. In such an example, the screening mechanism is thus operable to switch the headset between an AR mode and a VR mode.

Further examples include non-AR smart glasses (e.g., an electronics enabled eyewear device without a near-eye display mechanism configured to render AR and/or VR content) that has incorporated in its lens system a native screening mechanism similar or analogous to that escribed with reference to FIG. 1-FIG. 7. In such examples, the screening mechanism can be used in the black-out optical condition as a sleeping or resting mask. Thus, when the screening mechanism is in its fully opaque optical state, the non-AR smart glasses are in a sleep or rest mode, not providing the option of a cinema mode or a VR mode as in the case of the AR glasses of FIG. 1.

Autonomous mode switching functionality and/or autonomous dynamic tint level control and are in some examples of such non-AR smart glasses provided by native onboard electronics of the glasses, similar or analogous to the opacity controller of FIG. 1-FIG. 7. In other examples of smart glasses with an incorporated screening mechanism similar analogous to that described with reference to FIGS. 1-7, no autonomous opacity control is provided by onboard electronics of the smart glasses. In such instances, opacity control of the lens system by operation of the screening mechanism is provided exclusively by the user directly. Selective user control of the screening mechanism in different examples comprise:

a. in some examples exclusively via user operation of an electromechanical actuating mechanism (e.g., such the step motor 208 described with reference to FIG. 2A, controlled in that example by push button 130);

b. in some examples exclusively via the operation of a mechanical control mechanism (see, e.g., description with reference FIG. 8A-FIG. 8C of manually actuated synchronized rotation of a movable polarizer); and c. in other examples, by user operation alternatively of either an integrated electromechanical control mechanism or an integrated mechanical control mechanism, at the user's preference.

Figure 8A:
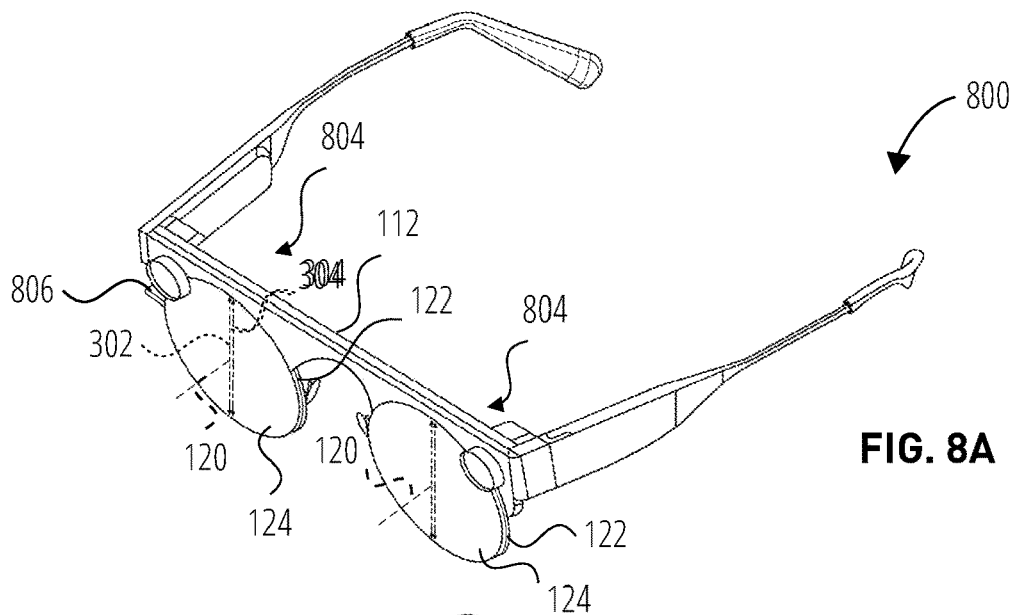
FIG. 8A is a schematic three-dimensional view of an eyewear device having a manually controllable optical screening mechanism incorporated in its lens system, according to one example, the lens system being disposed in a maximally transparent optical state.
Figure 8B:
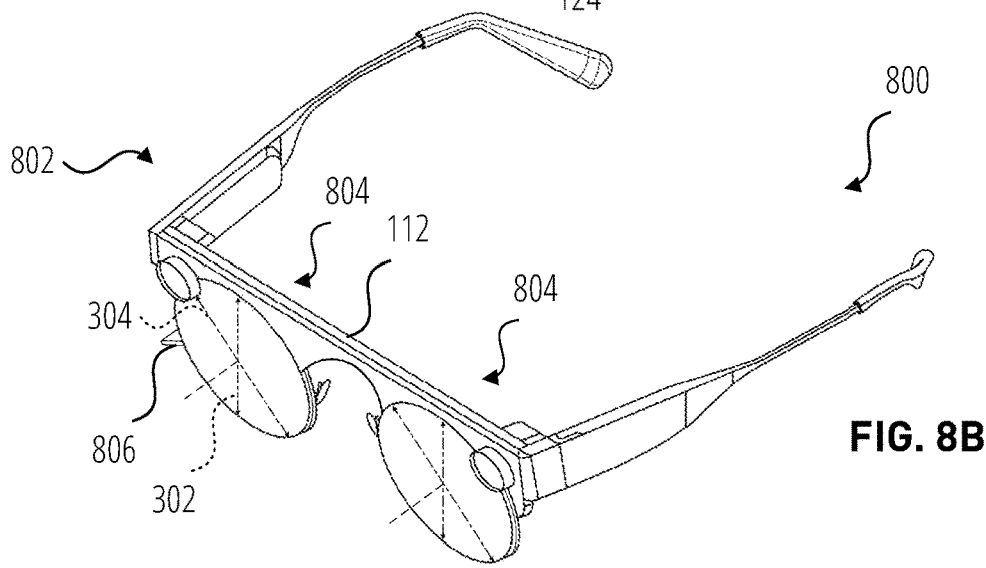
FIG. 8B is a view corresponding to the example of FIG. 8A, the lens system being disposed in a partially transparent, dimmed state.
Figure 8C:
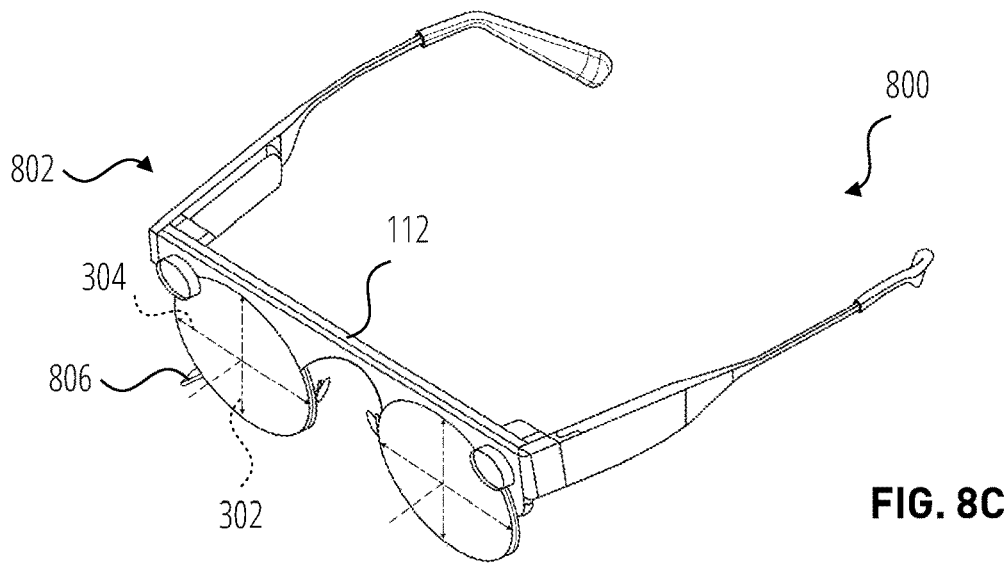
FIG. 8C is a view corresponding to the example of FIG. 8A, the lens system being disposed in a maximally opaque blackout state.

Finally, FIG. 8A-FIG. 8C show an example an eyewear device in the form of a pair of glasses 800 that is not electronically enabled, being referred to as a non-smart device consistent with the terminology above. Unless otherwise indicated, like reference numerals refer to like parts in, on the one hand, FIG. 1-FIG. 3B, and on the other hand, FIG. 8A-FIG. 8C.

The glasses 800 are analogous in physical construction to the AR glasses 100 described above with reference to FIG. 1-FIG. 3B, having a eyewear body comprising a lens-carrying frame 112 and a pair of hinged temples. A lens system through which the wearer's view of the environment is provided again comprises laterally spaced lens assemblies 804.

Each lens assembly 804 comprises, similar to the physical optical arrangement best seen in FIG. 2A, a pair of stacked polarizers provided by a polarized fixed lens 122 (e.g., in some examples being a composite lens comprising a clear glass base structure with a polarized film 202 and in other examples being a plate of polarized glass or transparent polymer) and a polarized filter 124 that is rotatable relative to the fixed lens 122 about a rotational axis 120 extending more or less along the wearer's line of sight, together providing a screening mechanism 102 to control the opacity of the lens assemblies 804 by controlling the relative orientation of respective polarization axes 302, 304 of the fixed lens 122 and the polarized filter 124. In contrast to the lens assemblies 110 of the AR glasses 100, the fixed lens 122 of glasses 800 does not include or provide any display elements or functionalities.

A further difference between the non-smart glasses 800 in this example and the AR glasses 100 is in the non-smart glasses 800 of an electromechanical actuator such as the step motor 208 described with reference to FIG. 2A. Instead, angular positioning of the polarized filter 124 (and therefore a misalignment angle between of the polarization axes 302, 304, which in turn determines the composite opacity or transmissivity to ambient light of the lens assembly 804) is mechanically adjustable by direct manual control by the user. In this example, polarized filter 124 of the right-hand lens assembly 804 has attached thereto a control tab 806 that projects radially outwards from the radially outer periphery of a lens rim within which the polarized filter 124 is held. This enables the user to change the rotational position of the polarized filter 124 by pushing or nudging the control tab 806 circumferentially downwards or upwards.

In this example embodiment, the polarized filter 124 of the left lens assembly 110 is connected by mechanical linkage (e.g., by a gear system housed by the interior of the frame) to synchronize and mirror movement of the laterally spaced pair of polarized filters 124. Thus, for example, if the user, by operation of the control tab 806, changes the angular position of the right-hand polarized filter 124 by 20°, the left-hand polarized filter 124 is automatically and immediately rotated by an equal amount in synchronization with the prime-moving right-hand polarized filter 124. In other examples, the respective lens assemblies 804 can be controlled separately.

Turning now to FIG. 8A in particular, it will be seen that the glasses 800 are shown in a maximally transparent optical state, with the polarization axes 302, 304 of the stacked polarizers being aligned, being parallel to one another. In FIG. 8B, the user has manually rotated the polarized filter 124 through about 45° from the position in FIG. 8A by turning the control tab 806 clockwise from their perspective. As such, the polarization axes 302, 304 of the stacked polarizers are at about a 45° angle to one another, thus increasing the opacity or tint of the lens assemblies 804, dimming the perceived brightness of the ambient environment to the user's preference.

In FIG. 8C, the glasses 800 are shown in a sleep mode or rest mode, in which the screening mechanism 102 is configured such that the lens system is in a maximally opaque optical state. In this example, the polarized filter 124 is displaceable through at least a full 90° from its maximally transparent position (FIG. 8A), so that the polarization axes 302, 304 of the stacked polarizers can, the maximally opaque position, be brought at right angles to one another to effectively block out all ambient light.

Use cases of the integrated screening mechanism of the lens assemblies 804 to selectively change the opacity or content of the lens system are similar or analogous to that described above with reference to FIG. 1-FIG. 7 (excluding, naturally, functionalities pertaining to integrated near eye display), with the exception that modulation or adjustment of lens system opacity is in all instances selectively performed manually by the user. Thus, in indoors or overcast conditions, the wearer can readily dispose the polarized filter 124 to the maximally transparent position of FIG. 8A. In outdoors or otherwise overly bright conditions, the wearer can manually adjust the tint or darkness of the glasses by rotating the control tab 806. The glasses 800 in this manner provides adjustable sunglass functionality in that the full range of tint levels that allow functional transparency in the given conditions are available for selection by the wearer.

Unlike conventional sunglasses, however, the wearer has the option to fully block out ambient light by manually moving the polarized filter 124 to the maximally opaque position of FIG. 8C. In such a block-out state, the glasses 800 provide functionality analogous to a sleep mask, allowing the user more effectively to relax, rest, or sleep in bright environments. Thus, for example, when using public transport or waiting to board at an airport, the wearer can conveniently access substantially all of the functionalities of a sleep mask by turning the glasses 800 fully dark. In this manner, a wearable device that the user is already wearing for other purposes provides additional sleep mask functionality, obviating the need for and hassle associated with carrying a separate sleep mask that is often mislaid and has but a singular function.

Machine Architecture

Figure 9:
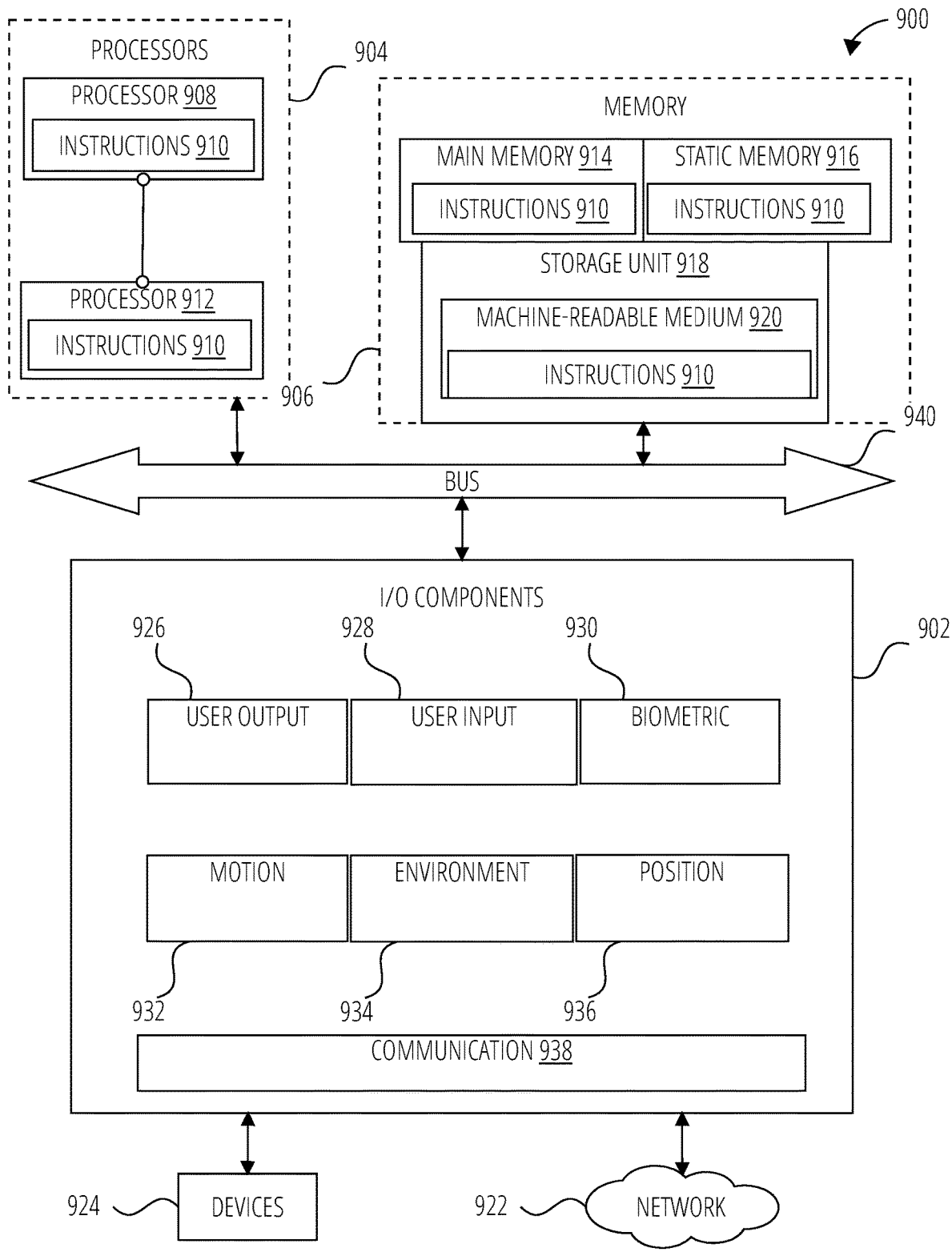
FIG. 9 is a diagrammatic representation of a machine in the form of a computer system within which a set of instructions may be executed for causing the machine to perform any one or more of the methodologies discussed herein, in accordance with some examples.

FIG. 9 is a diagrammatic representation of the machine 900 within which instructions 910 (e.g., software, a program, an application, an applet, an app, or other executable code) for causing the machine 900 to perform any one or more of the methodologies discussed herein may be executed. For example, the instructions 910 may cause the machine 900 to execute any one or more of the methods described herein. The instructions 910 transform the general, non-programmed machine 900 into a particular machine 900 programmed to carry out the described and illustrated functions in the manner described. The machine 900 may operate as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 910, sequentially or otherwise, that specify actions to be taken by the machine 900. Further, while only a single machine 900 is illustrated, the term "machine" shall also be taken to include a collection of machines that individually or jointly execute the instructions 910 to perform any one or more of the methodologies discussed herein. The machine 900, for example, may comprise the client device 402 or any one of a number of server devices forming part of the messaging server system 506. In some examples, the machine 900 may also comprise both client and server systems, with certain operations of a particular method or algorithm being performed on the server-side and with certain operations of the particular method or algorithm being performed on the client-side.

The machine 900 may include processors 904, memory 906, and input/output I/O components 902, which may be configured to communicate with each other via a bus 940. In an example, the processors 904 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 908 and a processor 912 that execute the instructions 910. The term "processor" is intended to include multi-core processors that may comprise two or more independent processors (sometimes referred to as "cores") that may execute instructions contemporaneously. Although FIG. 9 shows multiple processors 904, the machine 900 may include a single processor with a single-core, a single processor with multiple cores (e.g., a multi-core processor), multiple processors with a single core, multiple processors with multiples cores, or any combination thereof.

The memory 906 includes a main memory 914, a static memory 916, and a storage unit 918, both accessible to the processors 904 via the bus 940. The main memory 906, the static memory 916, and storage unit 918 store the instructions 910 embodying any one or more of the methodologies or functions described herein. The instructions 910 may also reside, completely or partially, within the main memory 914, within the static memory 916, within machine-readable medium 920 within the storage unit 918, within at least one of the processors 904 (e.g., within the Processor's cache memory), or any suitable combination thereof, during execution thereof by the machine 900.

The I/O components 902 may include a wide variety of components to receive input, provide output, produce output, transmit information, exchange information, capture measurements, and so on. The specific I/O components 902 that are included in a particular machine will depend on the type of machine. For example, portable machines such as mobile phones may include a touch input device or other such input mechanisms, while a headless server machine will likely not include such a touch input device. It will be appreciated that the I/O components 902 may include many other components that are not shown in FIG. 9. In various examples, the I/O components 902 may include user output components 926 and user input components 928. The user output components 926 may include visual components (e.g., a near-eye display such as a plasma near-eye display panel (PDP), a light-emitting diode (LED) near-eye display, a liquid crystal near-eye display (LCD), a projector, or a cathode ray tube (CRT)), acoustic components (e.g., speakers), haptic components (e.g., a vibratory motor, resistance mechanisms), other signal generators, and so forth. The user input components 928 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 902 may include biometric components 930, motion components 932, environmental components 934, or position components 936, among a wide array of other components. For example, the biometric components 930 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 932 include acceleration sensor components (e.g., accelerometer), gravitation sensor components, rotation sensor components (e.g., gyroscope).

The environmental components 934 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 402 may have a camera system comprising, for example, front cameras on a front surface of the client device 402 and rear cameras on a rear surface of the client device 402. The front cameras may, for example, be used to capture still images and video of a user of the client device 402 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 402 may also include a 360° camera for capturing 360° photographs and videos.

Further, the camera system of a client device 402 may include dual rear cameras (e.g., a primary camera as well as a depth-sensing camera), or even triple, quad or penta rear camera configurations on the front and rear sides of the client device 402. These multiple cameras systems may include a wide camera, an ultra-wide camera, a telephoto camera, a macro camera and a depth sensor, for example.

The position components 936 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 902 further include communication components 938 operable to couple the machine 900 to a network 922 or devices 924 via respective coupling or connections. For example, the communication components 938 may include a network interface Component or another suitable device to interface with the network 922. In further examples, the communication components 938 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 924 may be another machine or any of a wide variety of peripheral devices (e.g., a peripheral device coupled via a USB).

Moreover, the communication components 938 may detect identifiers or include components operable to detect identifiers. For example, the communication components 938 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 938, such as location via Internet Protocol (IP) geolocation, location via Wi-Fi® signal triangulation, location via detecting an NFC beacon signal that may indicate a particular location, and so forth.

The various memories (e.g., main memory 914, static memory 916, and memory of the processors 904) and storage unit 918 may store one or more sets of instructions and data structures (e.g., software) embodying or used by any one or more of the methodologies or functions described herein. These instructions (e.g., the instructions 910), when executed by processors 904, cause various operations to implement the disclosed examples.

The instructions 910 may be transmitted or received over the network 922, using a transmission medium, via a network interface device (e.g., a network interface component included in the communication components 938) and using any one of several well-known transfer protocols (e.g., hypertext transfer protocol (HTTP)). Similarly, the instructions 910 may be transmitted or received using a transmission medium via a coupling (e.g., a peer-to-peer coupling) to the devices 924.

Software Architecture

Figure 10:
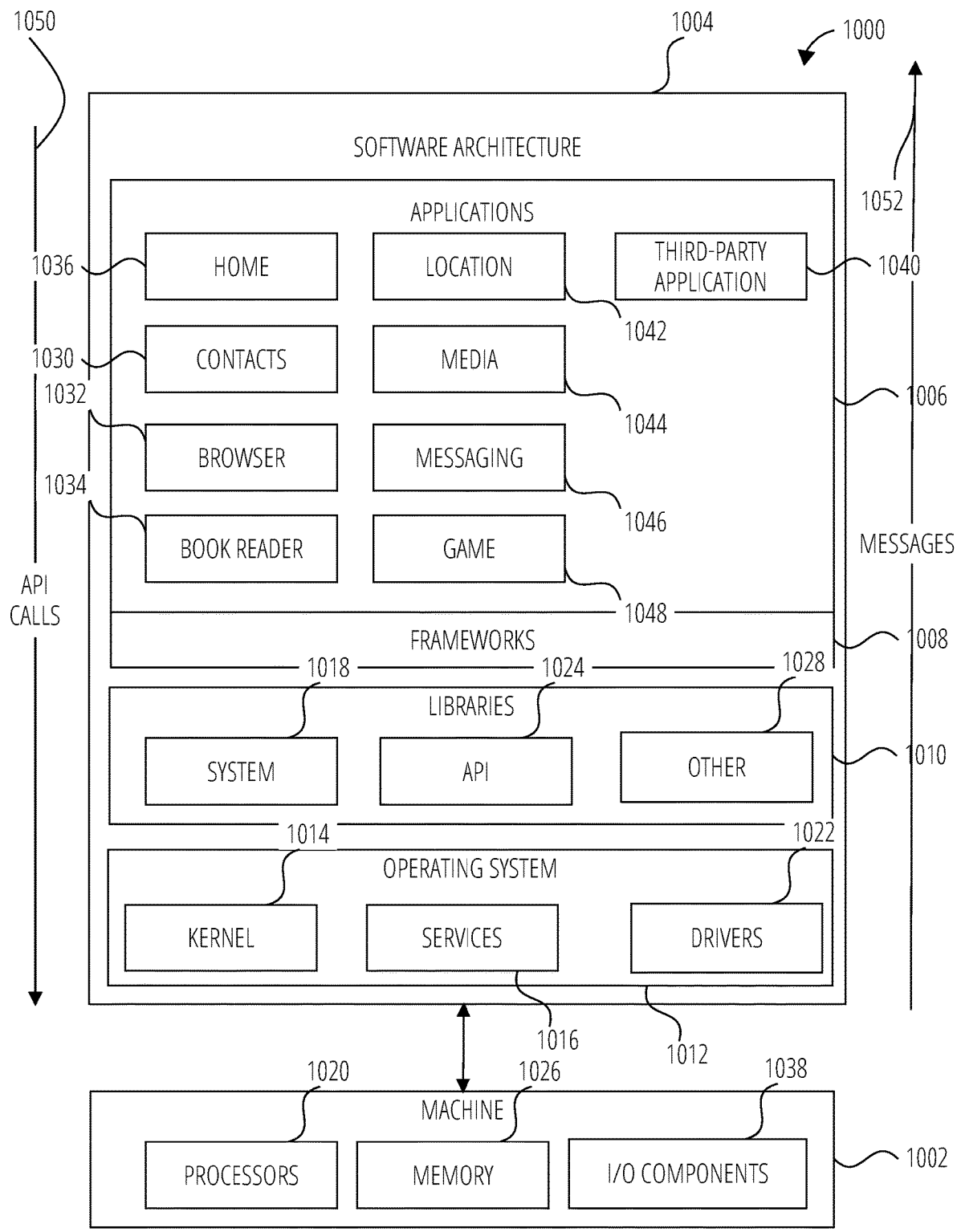
FIG. 10 is a block diagram showing a software architecture within which examples may be implemented.

FIG. 10 is a block diagram 1000 illustrating a software architecture 1004, which can be installed on any one or more of the devices described herein. The software architecture 1004 is supported by hardware such as a machine 1002 that includes processors 1020, memory 1026, and I/O components 1038. In this example, the software architecture 1004 can be conceptualized as a stack of layers, where each layer provides a particular functionality. The software architecture 1004 includes layers such as an operating system 1012, libraries 1010, frameworks 1008, and applications 1006. Operationally, the applications 1006 invoke API calls 1050 through the software stack and receive messages 1052 in response to the API calls 1050.

The operating system 1012 manages hardware resources and provides common services. The operating system 1012 includes, for example, a kernel 1014, services 1016, and drivers 1022. The kernel 1014 acts as an abstraction layer between the hardware and the other software layers. For example, the kernel 1014 provides memory management, processor management (e.g., scheduling), component management, networking, and security settings, among other functionality. The services 1016 can provide other common services for the other software layers. The drivers 1022 are responsible for controlling or interfacing with the underlying hardware. For instance, the drivers 1022 can include near-eye display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1010 provide a common low-level infrastructure used by the applications 1006. The libraries 1010 can include system libraries 1018 (e.g., C standard library) that provide functions such as memory allocation functions, string manipulation functions, mathematic functions, and the like. In addition, the libraries 1010 can include API libraries 1024 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a near-eye display), database libraries (e.g., SQLite to provide various relational database functions), web libraries (e.g., WebKit to provide web browsing functionality), and the like. The libraries 1010 can also include a wide variety of other libraries 1028 to provide many other APIs to the applications 1006.

The frameworks 1008 provide a common high-level infrastructure that is used by the applications 1006. For example, the frameworks 1008 provide various graphical user interface (GUI) functions, high-level resource management, and high-level location services. The frameworks 1008 can provide a broad spectrum of other APIs that can be used by the applications 1006, some of which may be specific to a particular operating system or platform.

In an example, the applications 1006 may include a home application 1036, a contacts application 1030, a browser application 1032, a book reader application 1034, a location application 1042, a media application 1044, a messaging application 1046, a game application 1048, and a broad assortment of other applications such as a third-party application 1040. The applications 1006 are programs that execute functions defined in the programs. Various programming languages can be employed to create one or more of the applications 1006, structured in a variety of manners, such as object-oriented programming languages (e.g., Objective-C, Java, or C++) or procedural programming languages (e.g., C or assembly language). In a specific example, the third-party application 1040 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1040 can invoke the API calls 1050 provided by the operating system 1012 to facilitate functionality described herein.

Glossary

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure. A device may include a lens assembly. A device may include an eyewear body on which the lens assembly is mounted, the eyewear body being configured for head-mounted wear during which the lens assembly is supported in position to occupy a field-of-view of a wearer, such that wearer-perspective view of an ambient environment is through the lens assembly. A device may include a display mechanism configured to provide to the wearer a near-eye display coincident with the lens assembly. A device may include a screening mechanism incorporated in the lens assembly and configured to selectively dispose the lens assembly between at least two different optical states comprising: a see-through state in which the lens assembly is functionally transparent, so that the near-eye display is overlaid on a view of the ambient environment provided by exterior light passing through the lens assembly; and an opaque state in which the lens assembly is functionally opaque to ambient light, blocking ambient backlighting of the near-eye display.

What is claimed is:

1. A device comprising:
   a lens assembly;
   an eyewear body on which the lens assembly is mounted, the eyewear body being configured for head-mounted wear during which the lens assembly is supported in position to occupy a field-of-view of a wearer, such that wearer-perspective view of an ambient environment is through the lens assembly;
   a display mechanism configured to provide to the wearer a near-eye display coincident with the lens assembly;
   a screening mechanism incorporated in the lens assembly and configured to selectively dispose the lens assembly between at least two different optical states comprising:
      a see-through state in which the lens assembly is functionally transparent, so that the near-eye display is overlaid on a view of the ambient environment provided by exterior light passing through the lens assembly; and
      an opaque state in which the lens assembly is functionally opaque to ambient light, blocking ambient backlighting of the near-eye display; and
   an opacity controller comprising one or more computer processor devices housed by the eyewear body, the one or more computer processor devices being configured for dynamic autonomous mode switching of the screening mechanism by performing operations comprising:
      continually receiving current sensor data captured by one or more sensors incorporated in the eyewear body; and
      based at least in part on the current sensor data, autonomously switching the lens assembly from one of the see-through state and the opaque state to the other.

2. The device of claim 1, wherein the screening mechanism is configured to enable disposal of the lens assembly a block-out state in which the lens assembly is fully opaque, blocking substantially any ambient light from passing through it.

3. The device of claim 1, wherein the screening mechanism is configured to enable graduated variation in opacity of the lens assembly, thereby enabling controlled graduated variation in ambient backlighting intensity to the near-eye display.

4. The device of claim 3, The device of claim 3, wherein the screening mechanism permits selective user-controlled graduated variation in opacity of the lens assembly.

5. The device of claim 3, wherein the screening mechanism is configured such that objective intensity of the near-eye display is unaffected by variation in opacity of the lens assembly.

6. The device of claim 1, wherein the screening mechanism comprises a pair of stacked polarizers incorporated in the lens assembly, the pair of polarizers being movable relative to one another under control of the opacity controller to modify composite opacity of the pair of polarizers by changing relative orientation of respective polarization axes of the stacked polarizers, to effect switching of the lens assembly between the see-through state and the opaque state.

7. The device of claim 6, wherein the pair of stacked polarizers comprises:
   a static polarizer fixed in position relative to the eyewear body; and
   a movable polarizer that is configured to be movable relative to the eyewear body about a rotational axis substantially aligned with an operative viewing direction through the lens assembly.

8. The device of claim 7, wherein the static polarizer is integrated with a primary optical element that forms part of the lens assembly and that hosts the near-eye display, the movable polarizer being located to a frontal side of the primary optical element, further from a wearer of the device, the near-eye display thus in wearer field-of-view being located in front of the movable polarizer.

9. The device of claim 8, wherein the movable polarizer is additionally manually adjustable in rotational orientation relative to the rotational axis.

10. The device of claim 8, wherein the opacity controller further comprises an actuator connected to the screening mechanism and configured to effect driven modification of a rotational orientation of the movable polarizer relative to the static polarizer.

11. The device of claim 10, further comprising, in addition to the opacity controller, a selective control mechanism configured to receive user-provided mode switching commands and, responsive thereto, to switch the lens assembly between the opaque state and the see-through state by driven movement of the movable polarizer via operation of the actuator.

12. The device of claim 1, wherein the opacity controller is configured to provide automated control of the screening mechanism by performing operations comprising:
   while the lens assembly is in a first one of its optical states, identifying satisfaction of predefined mode switching criteria applicable to said first optical state; and
   responsive to satisfaction of the applicable mode switching criteria, automatically effecting disposal of the lens assembly from said first optical mode to a second, different one of the optical states of the lens assembly.

13. The device of claim 12, wherein mode switching criteria for automatically switching the lens assembly from the see-through state to the opaque state comprises, in combination:
   that a wearer of the device is in a non-ambulatory state; and
   reception of selection input for reproduction by the near-eye display of non-AR visual content.

14. The device of claim 12, wherein mode switching criteria applicable to switching the lens assembly from the see-through state to the opaque state comprises identification that the wearer has entered a sleep state.

15. The device of claim 1, wherein the one or more computer processor devices are configured to trigger autonomous mode switching based at least in part on the current sensor data by use of a trained machine learning model.

16. A method comprising:
   accessing operational data from an electronics-enabled eyewear device having an optical system that is switchable between different optical states comprising a see-through state and an opaque state in which a wearer's view of their environment is obscured by the optical system, the operational data comprising a current optical state of the optical system and sensor data captured by one or more sensors integrated in the eyewear device;
   while the optical state is in a first one of its optical states, identifying satisfaction of predefined mode switching criteria applicable to said first optical state; and
   responsive to satisfaction of said mode switching criteria, automatically causing switching of the optical system from said first optical state to a second, different one of the optical states of the optical system, wherein switching the optical state of the optical system comprises relative rotation of one or a pair of stacked polarizers incorporated in the optical system, thereby to change relative orientation of respective polarization axes of the pair of polarizers.

17. The method of claim 16, wherein the predefined mode switching criteria applicable while the optical system is in the see-through state includes identification that the wearer has fallen asleep.

18. The method of claim 16, wherein the predefined mode switching criteria applicable while the optical system is in the see-through state includes identification that the wearer is in a non-ambulatory state.

19. A non-transitory computer-readable storage medium including instructions that, when executed by a one or more computer processor devices, configure the one o more computer processor devices to perform operations comprising:

accessing operational data from an electronics-enabled eyewear device having an optical system that is switchable between different optical states comprising a see-through state and an opaque state in which a wearer's view of their environment is obscured by the optical system, the operational data comprising a current optical state of the optical system and sensor data captured by one or more sensors integrated in the eyewear device;

while the optical system is in a first one of its optical states, identifying satisfaction of predefined mode switching criteria applicable to said first optical state; and responsive to satisfaction of said mode switching criteria, automatically causing disposal of the optical system from said first optical state mode to a second, different one of the optical states of the optical system, wherein switching the optical state of the optical system is effected by controlled relative rotation of one or a pair of stacked polarizers incorporated in the optical system, thereby to change relative orientation of respective polarization axes of the pair of polarizers.

\* \* \* \* \*

UNITED STATES PATENT AND TRADEMARK OFFICE
CERTIFICATE OF CORRECTION

PATENT NO. : 12,204,108 B2  
APPLICATION NO. : 17/950923  
DATED : January 21, 2025  
INVENTOR(S) : Farid Zare Seisan Page 1 of 1

It is certified that error appears in the above-identified patent and that said Letters Patent is hereby corrected as shown below:

In the Claims

In Column 35, Line 46, in Claim 4, delete "The device of claim 3, The device of claim 3," and insert --The device of claim 3,-- therefor In Column 37, Line 17, in Claim 19, delete "o" and insert --or-- therefor Signed and Sealed this  
Twenty-third Day of September, 2025

John A. Squires  
*Director of the United States Patent and Trademark Office*